(12) United States Patent
Lynch

(10) Patent No.: US 11,863,002 B1
(45) Date of Patent: Jan. 2, 2024

(54) CHARGING SYSTEM FOR PORTABLE ELECTRONIC DEVICES

(71) Applicant: Pioneer Square Brands, Inc., Seattle, WA (US)

(72) Inventor: Riley Edwin Lynch, Greensboro, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/143,572

(22) Filed: May 4, 2023

Related U.S. Application Data

(63) Continuation-in-part of application No. 18/142,569, filed on May 2, 2023.

(51) Int. Cl.
*H02J 7/00* (2006.01)

(52) U.S. Cl.
CPC ................... *H02J 7/0044* (2013.01)

(58) Field of Classification Search
None
See application file for complete search history.

(56) References Cited

U.S. PATENT DOCUMENTS

| | | | | |
|---|---|---|---|---|
| 5,432,019 A * | 7/1995 | Hue | ....................... | B60L 53/80 |
| | | | | 429/10 |
| 6,399,239 B2 * | 6/2002 | Bolstad | ............... | H01M 50/204 |
| | | | | 429/96 |
| 8,889,283 B2 * | 11/2014 | Marchio | ............. | H01M 50/103 |
| | | | | 429/100 |
| 9,825,339 B2 * | 11/2017 | Suzuki | ................... | H02J 7/0048 |
| 2007/0141459 A1 * | 6/2007 | Goto | ................... | H01M 50/213 |
| | | | | 429/88 |
| 2009/0191452 A1 * | 7/2009 | Anantharaman | ... | H01M 10/613 |
| | | | | 429/120 |
| 2010/0297486 A1 * | 11/2010 | Fujii | ................... | H01M 10/651 |
| | | | | 429/120 |
| 2012/0214026 A1 * | 8/2012 | Moon | ................. | H01M 50/569 |
| | | | | 429/7 |
| 2019/0296658 A1 * | 9/2019 | Chung | .................. | H02M 7/003 |

\* cited by examiner

*Primary Examiner* — Xanthia C Relford
*Assistant Examiner* — Xanthia C Cunningham
(74) *Attorney, Agent, or Firm* — Grandview Law

(57) ABSTRACT

Systems and methods involve implementations such as a system including (I) a box assembly including a base, a first side, a second side, and an interior area, wherein the first side being oppositely positioned across the interior area from the second side, the first side including a protrusion extending from the first side away from the interior area, the second side including a protrusion extending from the second side away from the interior area, and the protrusion of the first side being at a different elevation than the protrusion of the second side with respect to the base.

20 Claims, 45 Drawing Sheets

CHARGING SYSTEM FOR PORTABLE ELECTRONIC DEVICES

SUMMARY

In one or more aspects a system for a portable electronic computing device including (I) at least one container assembly including (A) an interior area, (B) a base portion including an interior surface portion, (C) a first side portion including (i) an exterior surface portion facing away from the interior area, and (ii) at least one protrusion extending from the exterior surface portion, the at least one protrusion including a top surface portion and a bottom surface portion, the top surface portion being positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion, and wherein the first side portion in part bounds the interior area, and (D) a second side portion including (i) an exterior surface portion facing away from the interior area, and (ii) at least one protrusion extending from the exterior surface portion, the at least one protrusion including a top surface portion and a bottom surface portion, the top surface portion being positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion, wherein the second side portion in part bounds the interior area, and wherein the first side portion and the second side portion being opposingly spaced from one another, and wherein the first elevation value of the top surface portion of the at least one protrusion of the first side portion being greater than the first elevation value of the top surface portion of the at least one protrusion of the second side portion. Wherein the second elevational value of the bottom surface portion of the at least one protrusion of the first side portion being at least equal to the first elevation value of the top surface portion of the at least one protrusion of the second side portion. Wherein the second elevational value of the bottom surface portion of the at least one protrusion of the first side portion is equal to the first elevation value of the top surface portion of the at least one protrusion of the second side portion. Wherein the at least one protrusion of the first side portion includes a thickness portion between the top surface portion and the bottom surface portion of the at least one protrusion of the first side portion, wherein a difference between the first elevational value of the top surface portion of the at least one protrusion of the first side portion and the first elevational value of the top surface portion of the at least one protrusion of the second side portion being at least equal to the thickness portion of the at least one protrusion of the first side portion. Wherein the at least one protrusion of the first side portion includes a thickness portion between the top surface portion and the bottom surface portion of the at least one protrusion of the first side portion, wherein a difference between the first elevation value of the top surface portion of the at least one protrusion of the first side portion and the first elevational value of the top surface portion of the at least one protrusion of the second side portion being equal to the thickness portion of the at least one protrusion of the first side portion. Wherein the top surface portion of the at least one protrusion of the first side portion being flat, wherein the bottom surface portion of the at least one protrusion of the first side portion being flat, wherein the top surface portion of the at least one protrusion of the second side portion being flat, and wherein the bottom surface portion of the at least one protrusion of the second side portion being flat. Further including at least one duplicate of the at least one protrusion of the first side portion, and further including at least one duplicate of the at least one protrusion of the second side portion, wherein the at least one protrusion of the first side of the container assembly includes at least one first protrusion, the first protrusion including an aperture, the aperture including a center location, wherein the at least one duplicate of the at least one protrusion of the first side of the container assembly includes at least one second protrusion of the first side portion, the second protrusion including an aperture, the aperture including a center location, wherein the center location of the aperture of the first protrusion of the first side being spaced from the first side a first distance, wherein the center location of the aperture of the second protrusion of the first side being spaced from the first side a second distance, and wherein the first distance being equal to the second distance. Wherein the exterior surface portion of the first side portion occupying a portion of a plane, wherein the at least one protrusion of the first side portion includes at least one aperture including a center, wherein the center of the at least one aperture of the at least one protrusion of the first side portion being spaced from the plane of the exterior surface portion of the first side portion a first distance, wherein the exterior surface portion of the second side portion occupying a portion of a plane, wherein the at least one protrusion of the second side portion includes at least one aperture including a center, wherein the center of the at least one aperture of the at least one protrusion of the second side portion being spaced from the plane of the exterior surface portion of the second side portion a second distance, and wherein first distance between the center of the at least one aperture of the at least one protrusion of the first side portion from the plane of the exterior surface portion of the first side portion equals the second distance between the center of the at least one aperture of the at least one protrusion of the second side portion from the plane of the exterior surface portion of the second side portion. Furthermore including at least one duplicate of the at least one protrusion of the first side portion, and further including at least one duplicate of the at least one protrusion of the second side portion, wherein the at least one protrusion of the first side of the container assembly includes at least one first protrusion, the first protrusion including an aperture, the aperture including a center location, wherein the at least one duplicate of the at least one protrusion of the first side of the container assembly includes at least one second protrusion of the first side portion, the second protrusion including an aperture, the aperture including a center location, wherein the center location of the aperture of the first protrusion of the first side being spaced from the center location of the aperture of the second protrusion of the first side a first distance, wherein the at least one protrusion of the second side of the container assembly includes at least one first protrusion, the first protrusion including an aperture, the aperture including a center location, wherein the at least one duplicate of the at least one protrusion of the second side of the container assembly includes at least one second protrusion, the second protrusion including an aperture, the aperture including a center location, wherein the center location of the aperture of the first protrusion of the second side being spaced from the center location of the aperture of the second protrusion of the second side a second distance, and wherein the first distance being equal to the second distance. Wherein the first side portion of the at least one container assembly further includes an end portion, wherein the end portion of the first side portion being extended parallel to the plane of the interior surface portion of the base portion, wherein the end portion of the first side portion being positioned from the plane of the interior surface portion of the base portion a distance greater than any other portion of the first side portion, and wherein the surface portion of the at least one protrusion being closer to the end portion of the first side portion than to the base portion. Wherein the base portion includes (i) a first portion in part bounding the interior area of the at least one container assembly, and (ii) a second portion including at least one notch, wherein the exterior surface portion of the first side portion occupying a portion of a plane, wherein the exterior surface portion of the second side portion occupying a portion of a plane, wherein the second portion of the base portion being extended in a direction opposite from a direction that the first portion of the base portion being extended with respect to a selected reference plane being selected from one of the following: the plane of the exterior surface portion of the first side portion of the at least one container assembly or the plane of the exterior surface portion of the second side portion of the at least one container assembly, wherein the at least one protrusion of the first side portion includes at least one aperture including a center, wherein the at least one protrusion of the second side portion includes at least one aperture including a center, and wherein the at least one notch of the second portion of the base portion being aligned along a directional axis, the directional axis being perpendicular to the plane of the interior surface portion of the base portion, the at least one notch of the second portion of base portion being aligned with a selected center being selected from one of the following: the center of the at least one aperture of the at least one first side portion or the center of the at least one aperture of the at least one second side portion. Wherein the second portion of the base portion extends further from the selected reference plane than the selected center extends from the selected reference plane. Further including (II) at least one housing including a first side, a second side, and a plurality of members extending between the first side and the second side, wherein the plurality of members include a first member and a second member, wherein the first member including at least one aperture, wherein the second member including at least one aperture, wherein the at least one protrusion of the first side portion includes at least one aperture, wherein the at least one protrusion of the second side portion includes at least one aperture, and wherein the at least one aperture of the first member spaced from the at least one aperture of the second member to allow for simultaneous alignment of the at least one aperture of the at least one protrusion of the first side with the at least one aperture of the first member and simultaneous alignment of the at least one aperture of the at least one protrusion of the second side with the at least one aperture of the second member. Further including at least one duplicate of the at least one container assembly, wherein the at least one duplicate of the at least one container assembly includes at least one second container assembly, wherein the at least one aperture of the at least one protrusion of the first side of the at least one container assembly being coupled with the at least one aperture of the first member of the at least one housing, wherein the at least one aperture of the at least one protrusion of the second side of the at least one second container assembly being coupled with the at least one aperture of the first member of the at least one housing, wherein the at least one aperture of the at least one protrusion of the second side of the at least one second container assembly being coupled with the at least one aperture of the at least one protrusion of the first side of the at least one container assembly, and wherein the at least one aperture of the at least one protrusion of the first side of the at least one second container assembly being coupled with the at least one aperture of the second member of the at least one housing.

In one or more aspects a system for a portable electronic computing device including (I) at least one first box assembly including a base, a first side, a second side, and an interior area, wherein the first side being oppositely positioned across the interior area from the second side, the first side including at least one protrusion extending from the first side away from the interior area, the second side including at least one protrusion extending from the second side away from the interior area, and the at least one protrusion of the first side being at a different elevation than the at least one protrusion of the second side with respect to the base. Further including at least one duplicate of the at least one first box assembly, wherein the at least one duplicate of the at least one first box assembly includes at least one second box assembly, wherein the at least one protrusion of the first side of the at least one first box assembly being coupled to the at least one protrusion of the second side of the at least one second box assembly. Further including at least one housing, wherein the at least one housing includes a first side, a second side, and a plurality of members extending between the first side and the second side, wherein the plurality of members includes a first member, wherein the first member including at least one location point, wherein the at least one protrusion of the first side of the at least one first box assembly being coupled to the at least one location point of the first member, and wherein the at least one protrusion of the second side of the at least one second box assembly being coupled to the at least one location point of the first member.

In one or more aspects a system for a portable electronic computing device including (I) a plurality of boxes, the plurality of boxes including a plurality of bases, a plurality of first sides, a plurality of second sides, and plurality of interior areas, wherein the plurality of first sides being positioned opposite of the plurality of second sides, wherein the plurality of first sides includes a plurality of protrusions extending from the plurality of first sides away from the plurality of interior areas, and wherein the plurality of second sides includes a plurality of protrusions extending from the plurality of second sides away from the plurality of interior areas; and (II) at least one housing including a first side and a second side and a plurality of members extending from the first side to the second side, the plurality of members including a plurality of location points, wherein the plurality of protrusions of the plurality of first sides of the plurality of boxes being coupled with the plurality of location points of the plurality of members of the at least one housing, and wherein the plurality of protrusions of the plurality of second sides of the plurality of boxes being coupled with the plurality of location points of the plurality of members of the at least one housing. Wherein the plurality of location points of the plurality of members of the at least one housing being a plurality of apertures. Wherein the plurality of protrusions of the plurality of first sides of the plurality of boxes being coupled with the plurality of location points of the plurality of members of the at least one housing via threaded members, and wherein the plurality of protrusions of the plurality of second sides of the plurality of boxes being coupled with the plurality of location points of the plurality of members of the at least one housing via threaded members.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Charging System for Portable Electronic Devices, articles of manufacture, compositions of matter for same that may provide context, for instance, in introducing one or more processes and/or devices described herein.

DETAILED DESCRIPTION

Figure 1:
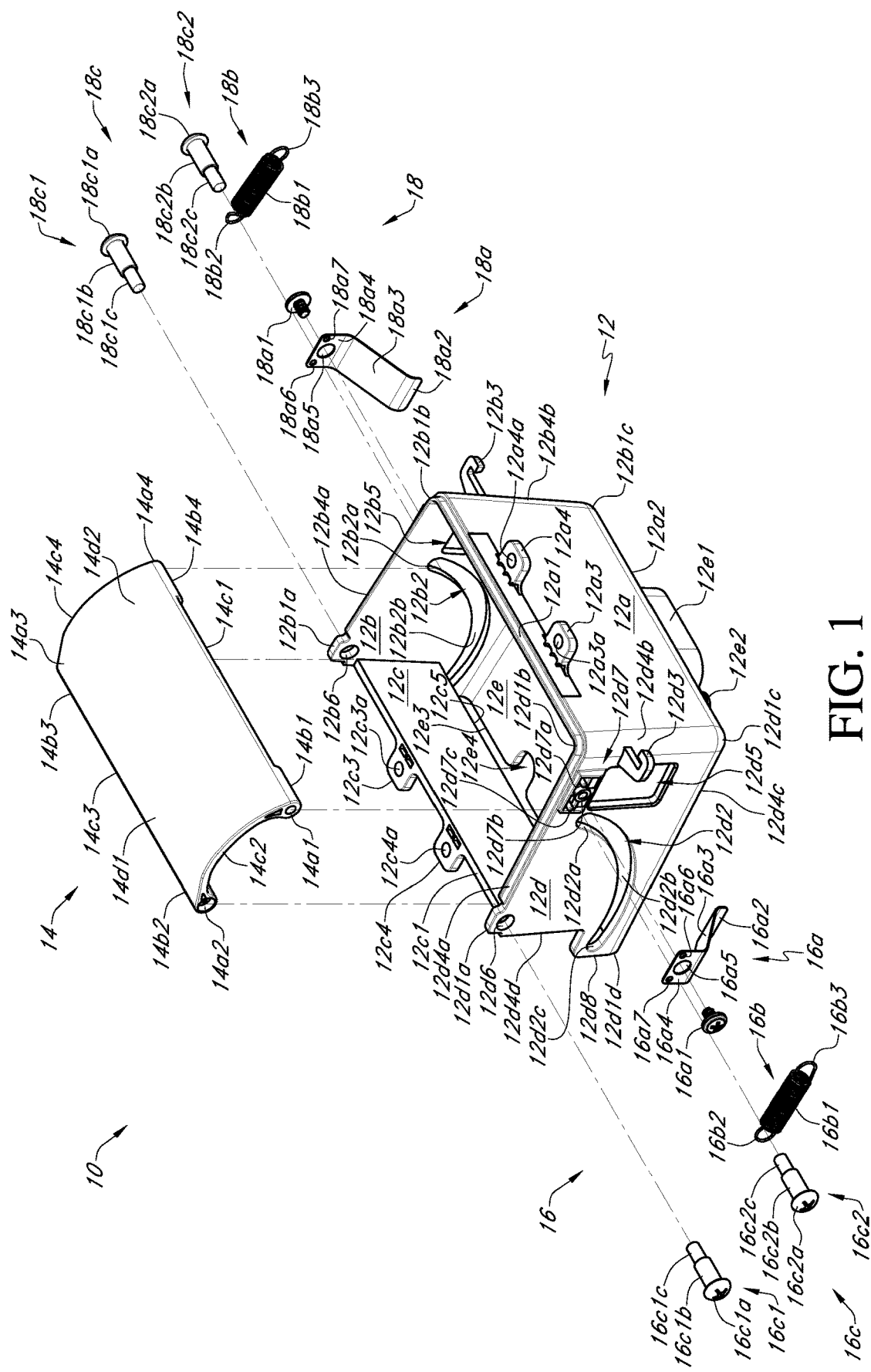
FIG. 1 is an exploded left top front perspective view of a holder for a portable electronic device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded left top front perspective view of holder assembly 10. Depicted implementation of holder assembly 10 is shown to include container assembly 12, curvilinearly formed semi-rigid sheet assembly 14, side assembly 16, and side assembly 18.

Depicted implementation of container assembly 12 (e.g. box assembly) is shown to include side portion 12a, side portion 12b, side portion 12c, side portion 12d, and base portion 12e shown to in part bound an interior area with each of their interior surface portions. In implementations, side portion 12a and side portion 12c are opposingly spaced from one another and side portion 12b and side portion 12d are opposingly spaced from one another. As shown side portion 12a, side portion 12b, side portion 12c, side portion 12d have exterior surface portions facing away from the interior area. As depicted, base portion 12e is being planarly formed to include an interior surface portion occupying a portion of a plane. Implementations of one or more portions of container assembly 12 can include at least one of the following materials: rigid plastic, polycarbonate, acrylonitrile butadiene styrene, thermoplastic polymer, thermoplastic polyurethane, polyethylene terephthalate, and nylon.

Depicted implementation of side portion 12a is shown to include edge 12a1, edge 12a2, protrusion 12a3 with aperture 12a3a, and protrusion 12a4 with aperture 12a4a. As shown, protrusion 12a3 and protrusion 12a4 have top surface portions and bottom surface portions (in implementations depicted as flat), in which the top surface portion are positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion.

Depicted implementation of side portion 12b is shown to include protrusion 12b1a, corner 12b1b, and corner 12b1c. Depicted implementation of side portion 12b is shown to include curvilinear slot 12b2 with end portion 12b2a and with mid portion 12b2b. Depicted implementation of side portion 12b is shown to include hook 12b3, edge 12b4a, edge 12b4b, aperture 12b5, and aperture 12b6.

Depicted implementation of side portion 12c is shown to include edge 12c1, protrusion 12c3 with aperture 12c3a, protrusion 12c4 with aperture 12c4a, and edge 12c5. As shown, protrusion 12c3 and protrusion 12c4 have top surface portions and bottom surface portions (in implementations depicted as flat), in which the top surface portion are positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion.

Depicted implementation of side portion 12d is shown to include protrusion 12d1a, corner 12d1b with corner 12d1c, and corner 12d1d. Depicted implementation of side portion 12d is shown to further include curvilinear slot 12d2 with end portion 12d2a, mid portion 12d2b, end portion 12d2c, and is further shown to include hook 12d3. Both curvilinear slot 12b2 and curvilinear slot 12d2 are shown to each include being one continuous curve of varying radius of curvature including a first radius of curvature closer to a first end (e.g., end portion 12d2a) than a second end (e.g., end portion 12d2c), and a second radius of curvature closer to the second end (e.g., end portion 12d2c) wherein the first radius of curvature being smaller than the second radius of curvature.

Depicted implementation of side portion 12d is further shown to include edge 12d4a, edge 12d4b, edge 12d4c, and edge 12d4d. Depicted implementation of side portion 12d is further shown to include aperture 12d5, aperture 12d6 and coupler 12d7, with stem 12d7a, aperture 12d7b, and stem 12d7c, and is shown to further include protrusion 12d8 and corner 12d1d. Depicted implementation of base portion 12e is shown to include device interface rear 12e1, device interface front 12e2, edge 12e3, and notch 12e4.

Depicted implementation of curvilinearly formed semi-rigid sheet assembly 14 is shown to include corner aperture 14a1, corner aperture 14a2, corner aperture 14a3, and corner aperture 14a4. In implementations curvilinearly formed semi-rigid sheet assembly 14 is coupled with container assembly 12 to include shown a first axis of rotation including through corner aperture 14a1 and corner aperture 14a4 about curvilinear slot 12d2 and curvilinear slot 12b2, respectively wherein curvilinear slot 12d2 and curvilinear slot 12b2 are shown as opposingly spaced from one another and curvilinearly formed semi-rigid sheet assembly 14 is shown to be movably couplable to curvilinear slot 12d2 and curvilinear slot 12b2.

In implementations curvilinearly formed semi-rigid sheet assembly 14 is coupled with container assembly 12 to include a second axis of rotation including through corner aperture 14a2 and corner aperture 14a3 about aperture 12d6 and aperture 12b6, respectively. In implementations curvilinearly formed semi-rigid sheet assembly 14 is coupled with container assembly 12 to include an axis of translation including through corner aperture 14a1 and corner aperture 14a4 about curvilinear slot 12d2 and curvilinear slot 12b2.

Depicted implementation of curvilinearly formed semi-rigid sheet assembly 14 is further shown to include member 14b1, member 14b2, member 14b3, and member 14b4. Depicted implementation of curvilinearly formed semi-rigid sheet assembly 14 is further shown to include side 14c1, side 14c2, side 14c3, and side 14c4. Depicted implementation of curvilinearly formed semi-rigid sheet assembly 14 is further shown to include rear upper surface portion 14d1, and front upper surface portion 14d2.

Depicted implementation of side assembly 16 is shown to include semi-rigid member 16a, spring 16b, corner aperture 14a3, and coupler assembly 16c. Depicted implementation of semi-rigid member 16a is shown to include coupler 16a1 (e.g., threaded member such as screw or bolt), edge 16a2, angled portion 16a3, coupling portion 16a4, aperture 16a5, aperture 16a6, and aperture 16a7. Depicted implementation of spring 16b is shown to include coil body 16b1, end 16b2, and end 16b3. Depicted implementation of coupler assembly 16c is shown to include coupler 16c1 with head 16c1a, pin portion 16c1b, and coupler portion 16c1c. Depicted implementation of coupler assembly 16c is further shown to include coupler 16c2 with head 16c2a, pin portion 16c2b, and coupler portion 16c2c.

Depicted implementation of side assembly 18 is shown to include semi-rigid member 18a, semi-rigid member 18a, and coupler assembly 18c. Depicted implementation of semi-rigid member 18a is shown to include coupler 18a1 (e.g. threaded member such as screw, bolt, etc), edge 18a2, angled portion 18a3, coupling portion 18a4, aperture 18a5, and aperture 18a6, and aperture 18a7. Depicted implementation of spring 18b is shown to include spring 18b with coil body 18b1, end 18b2, and end 18b3. Depicted implementation of coupler assembly 18c is shown to include coupler 18c1, with head 18c 1a, pin portion 18c1b, and coupler portion 18c1c, and shown to include coupler 18c2 with head 18c2a, pin portion 18c2b, and coupler portion 18c2c.

Figure 2:
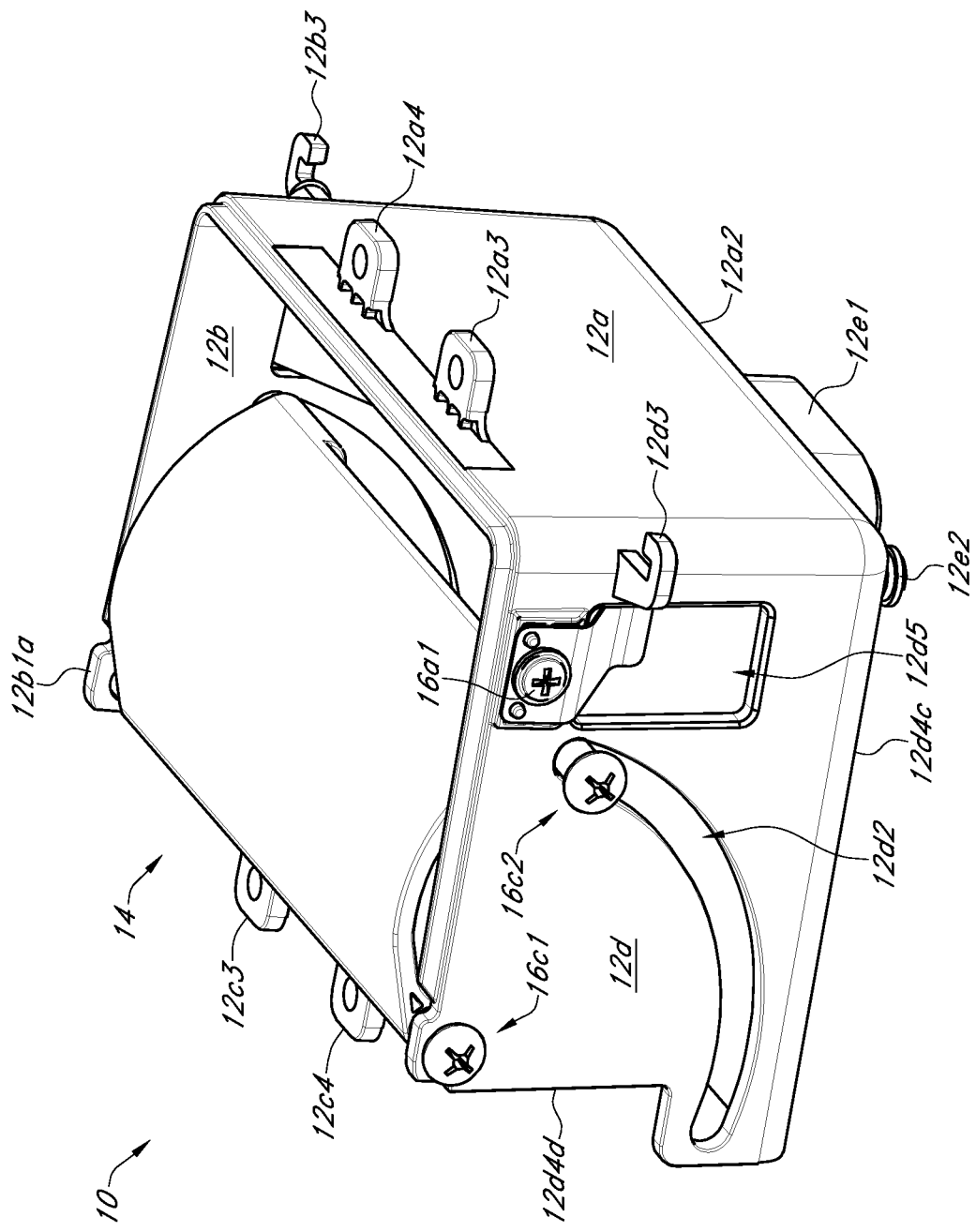
FIG. 2 is a left top front perspective view of the holder of FIG. 1.

Turning to FIG. 2, depicted therein is a left top front perspective view of holder assembly 10. Depicted implementation of base portion 12e of container assembly 12 is shown to include device interface front 12e2. As depicted, side portion 12a is shown opposingly spaced from curvilinearly formed semi-rigid sheet assembly 14.

Figure 3:
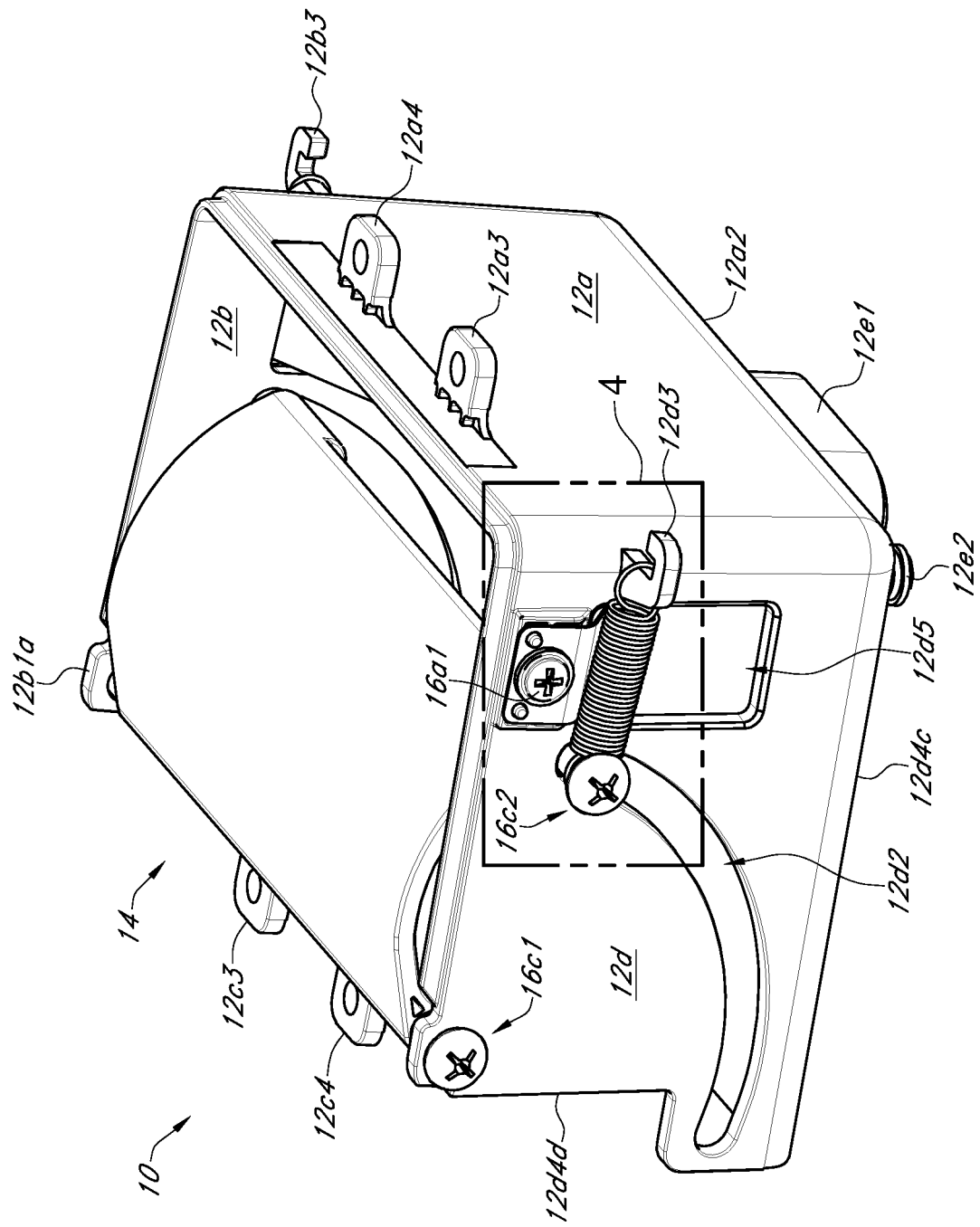
FIG. 3 is a left top front perspective view of the holder of FIG. 1 with spring.

Turning to FIG. 3, depicted therein is a left top front perspective view of holder assembly 10 including spring 16b.

Figure 4:
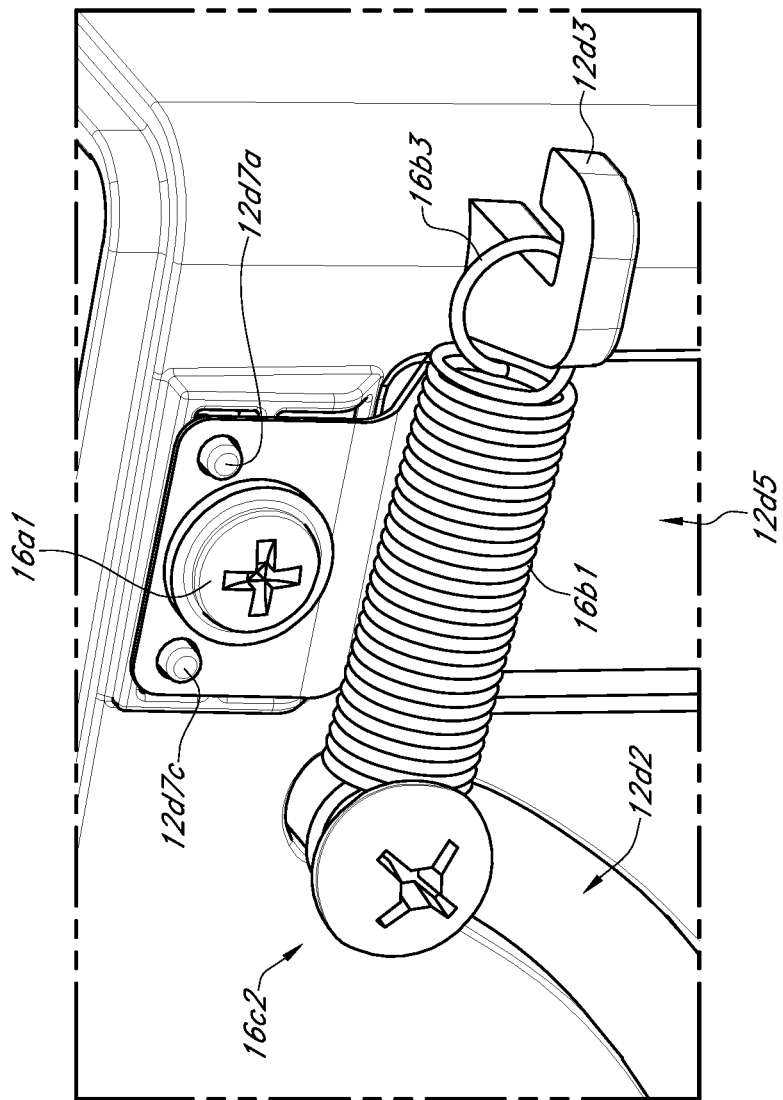
FIG. 4 is an enlarged view of a portion of the holder of FIG. 1 taken along the dashed rectangle labeled "4" of FIG. 3.

Turning to FIG. 4, depicted therein is an enlarged view of a portion of holder assembly 10 taken along the dashed rectangle labeled "4" of FIG. 3.

Figure 5:
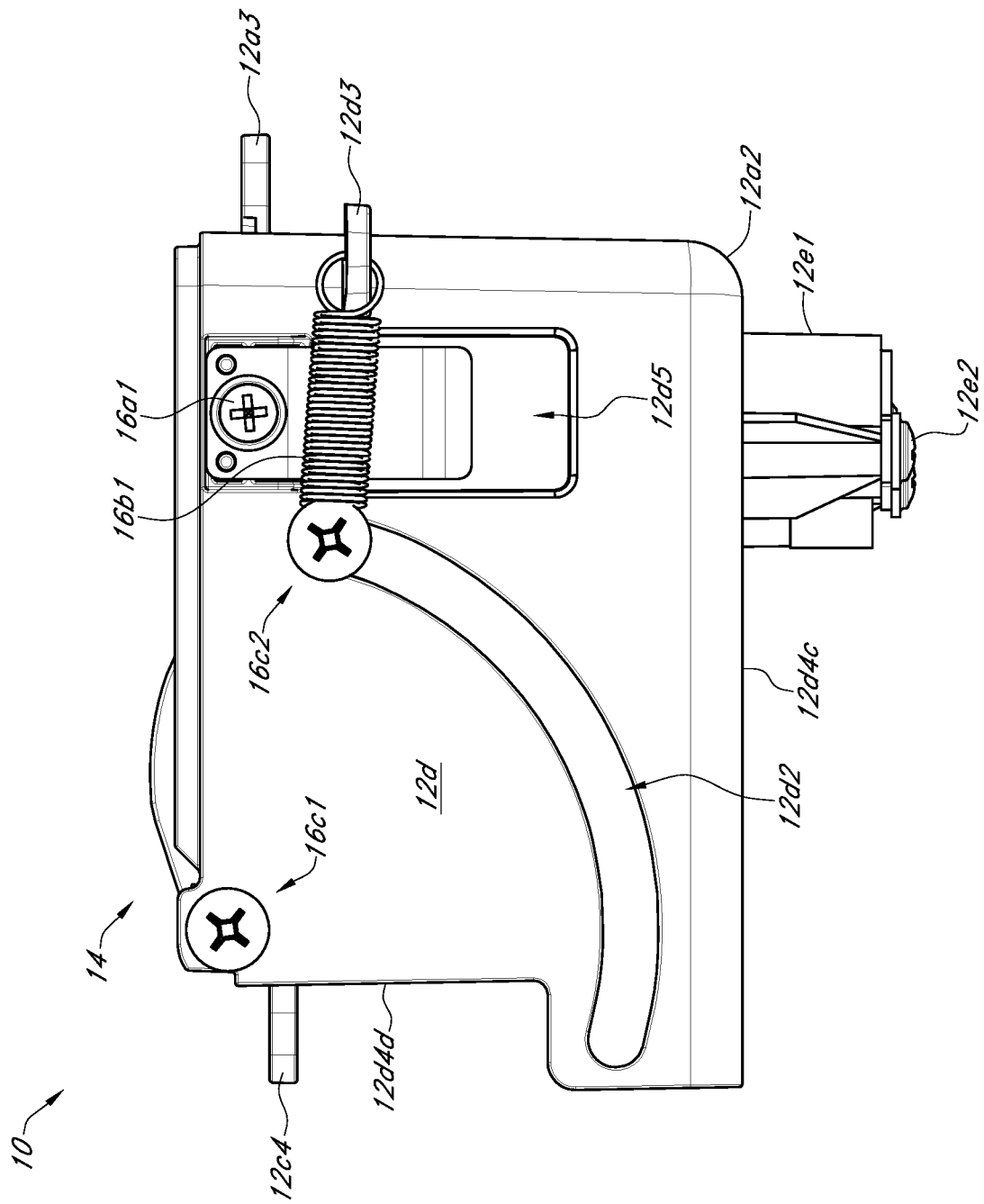
FIG. 5 is a side elevational view of the holder of FIG. 1.

Turning to FIG. 5, depicted therein is a side elevational view of holder assembly 10. As shown, protrusion 12a3 and protrusion 12a4 have an elevation value greater than protrusion 12c3 and protrusion 12c4 by at least the thickness of protrusion 12a3 and protrusion 12a4. In implementations the bottom surfaces of protrusion 12a3 and protrusion 12a4 have an elevation value greater than the top surfaces of protrusion 12c3 and protrusion 12c4.

Figure 6:
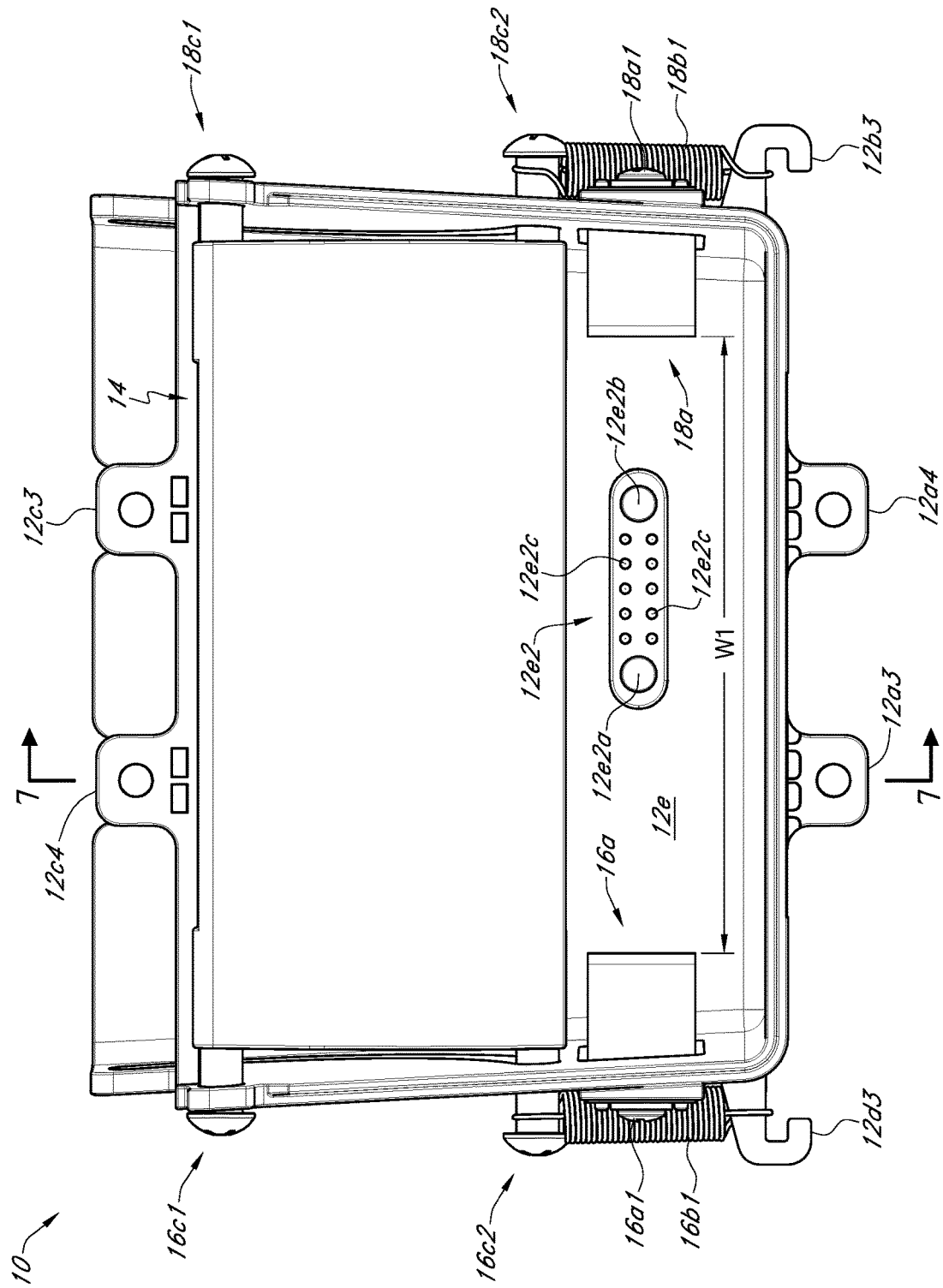
FIG. 6 is a top plan view of the holder of FIG. 1.

Turning to FIG. 6, depicted therein is a top plan view of holder assembly 10. Depicted implementation of holder assembly 10 is shown to include width dimension W1 between semi-rigid member 16a and semi-rigid member 18a which changes as semi-rigid member 16a and semi-rigid member 18a adjust to accommodate with a device being held. Depicted implementation of device interface front 12e2 of base portion 12e of container assembly 12 is shown to include contact 12e2a, contact 12e2b, and contact 12e2c. In implementations the center of aperture 12a3a of protrusion 12a3 is similarly distanced from side portion 12a as the center of aperture 12a4a of protrusion 12a4, which applies similarly to the pair of protrusion 12c3 and protrusion 12c4 with respect to distancing from side portion 12c. In implementations distancing between aperture centers of protrusion 12a3 and protrusion 12a4 are similar or equal to distancing between aperture centers of protrusion 12c3 and protrusion 12c4.

Figure 7:
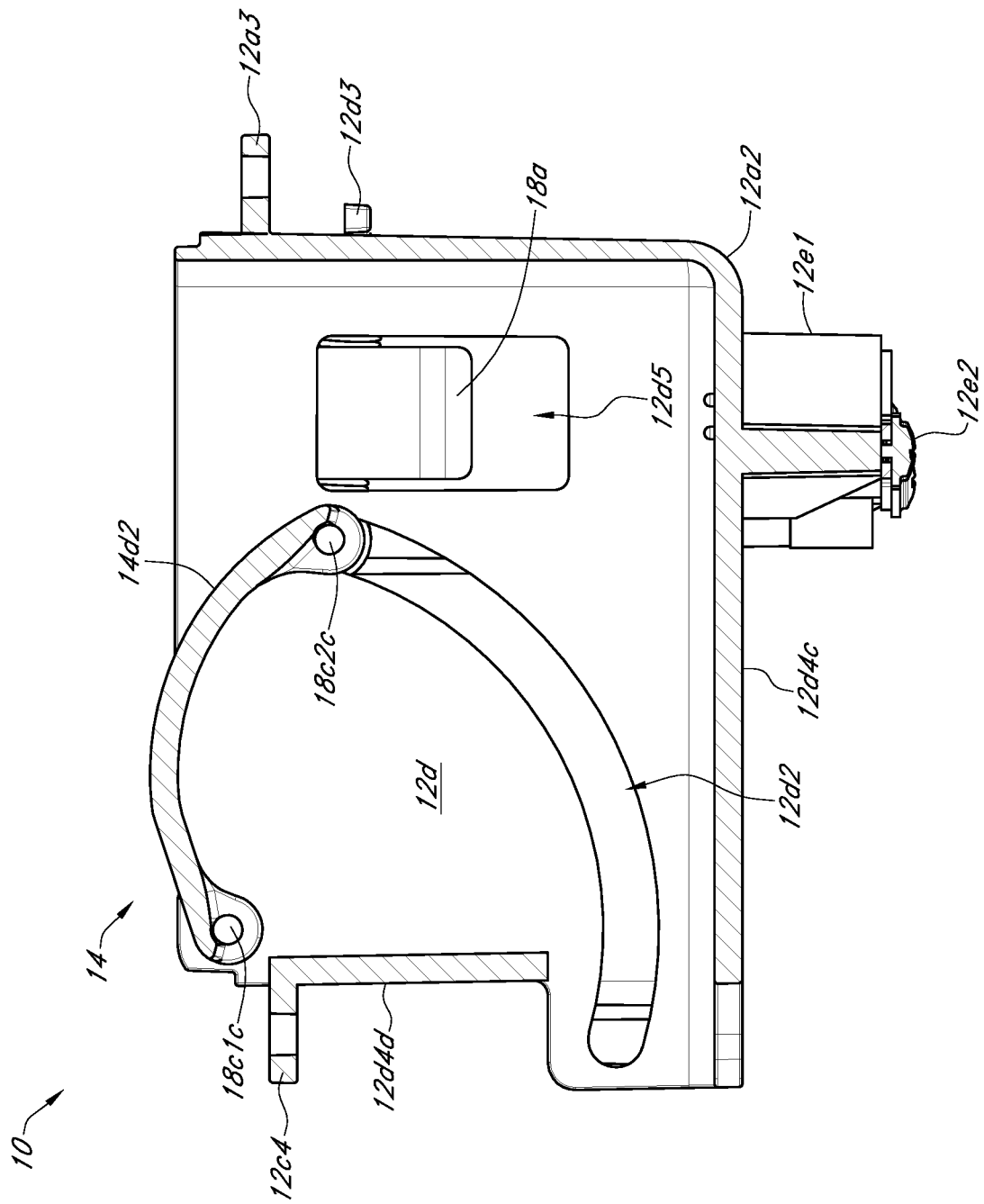
FIG. 7 is a side-elevational cross-sectional view of FIG. 1 taken along the 7-7 cutline of FIG. 6.

Turning to FIG. 7, depicted therein is a side-elevational cross-sectional view of holder assembly 10 taken along the 7-7 of FIG. 6. As shown, base portion 12e includes a portion that extends past the plane that occupies side portion 12c and also past how far the center of aperture 12c4a of protrusion 12c4 extends from side portion 12c.

Figure 8:
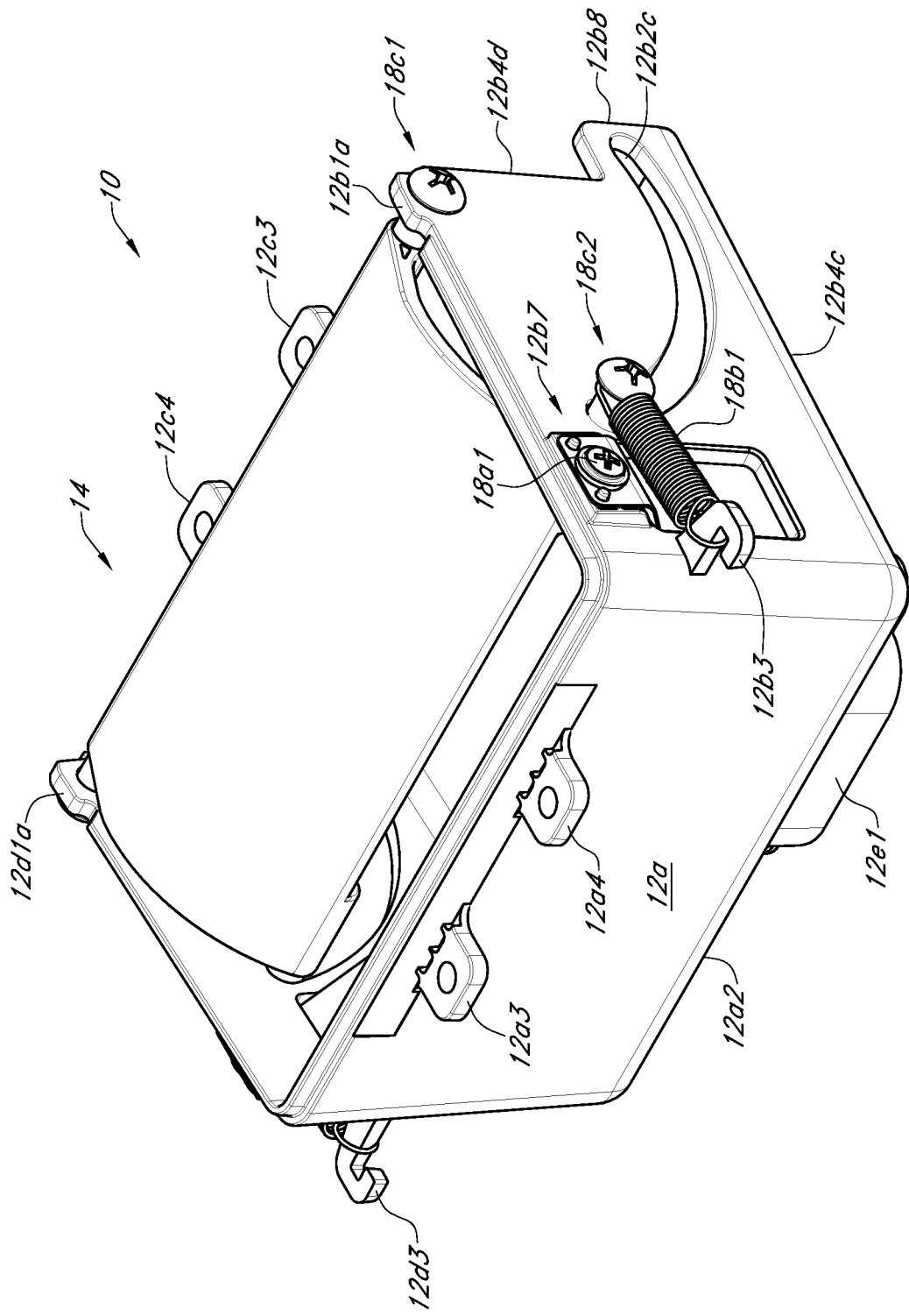
FIG. 8 is a right top front perspective view of the holder of FIG. 1.

Turning to FIG. 8, depicted therein is a right top front perspective view of holder assembly 10. Depicted implementation of curvilinear slot 12b2 of side portion 12b of container assembly 12 is shown to include end portion 12b2c. Depicted implementation of side portion 12b of container assembly 12 is shown to include edge 12b4c and edge 12b4d. Depicted implementation of side portion 12b of container assembly 12 is shown to include coupler 12b7, and protrusion 12b8.

Figure 9:
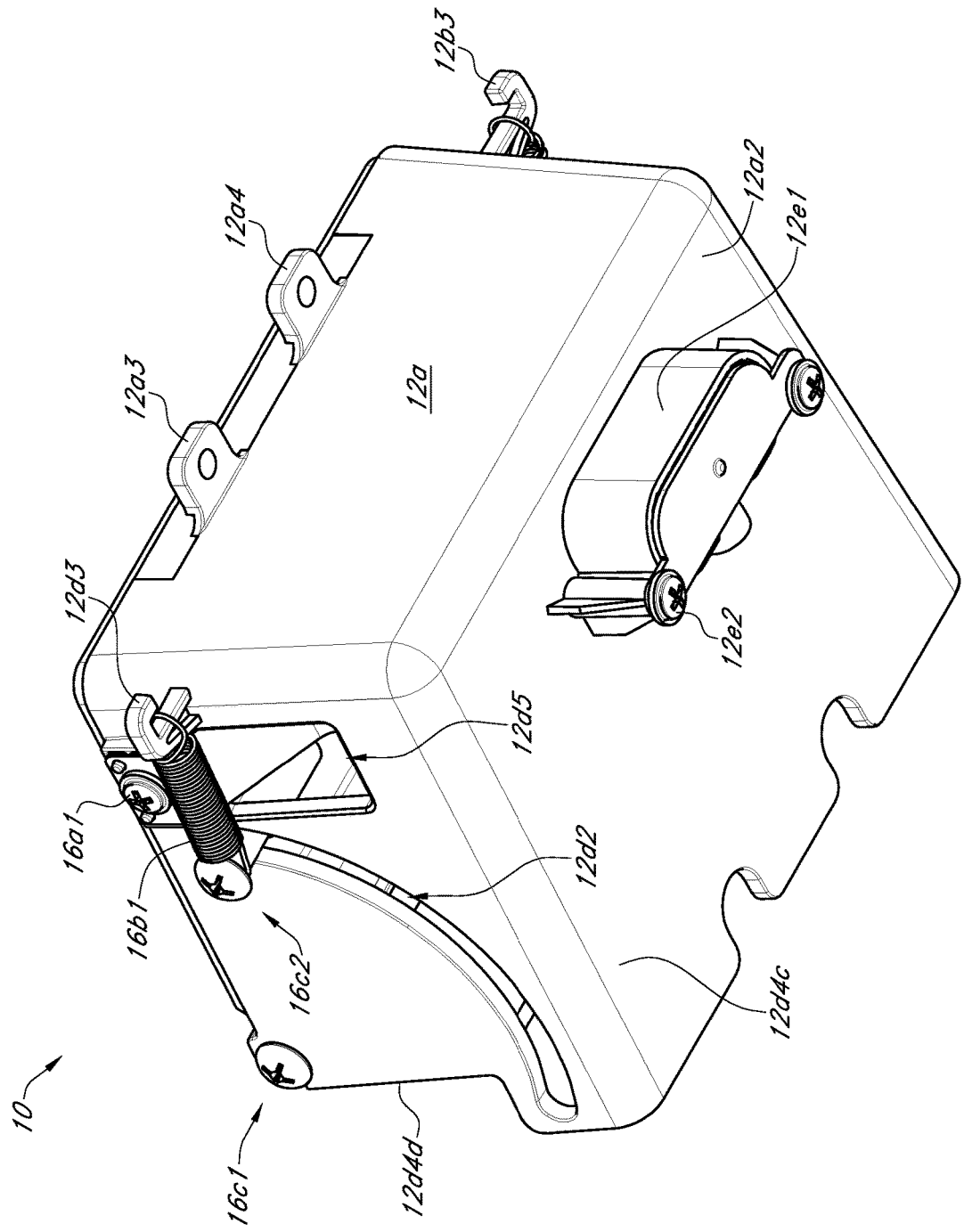
FIG. 9 is a left bottom front perspective view of the holder of FIG. 1.

Turning to FIG. 9, depicted therein is a left bottom front perspective view of holder assembly 10.

Figure 10:
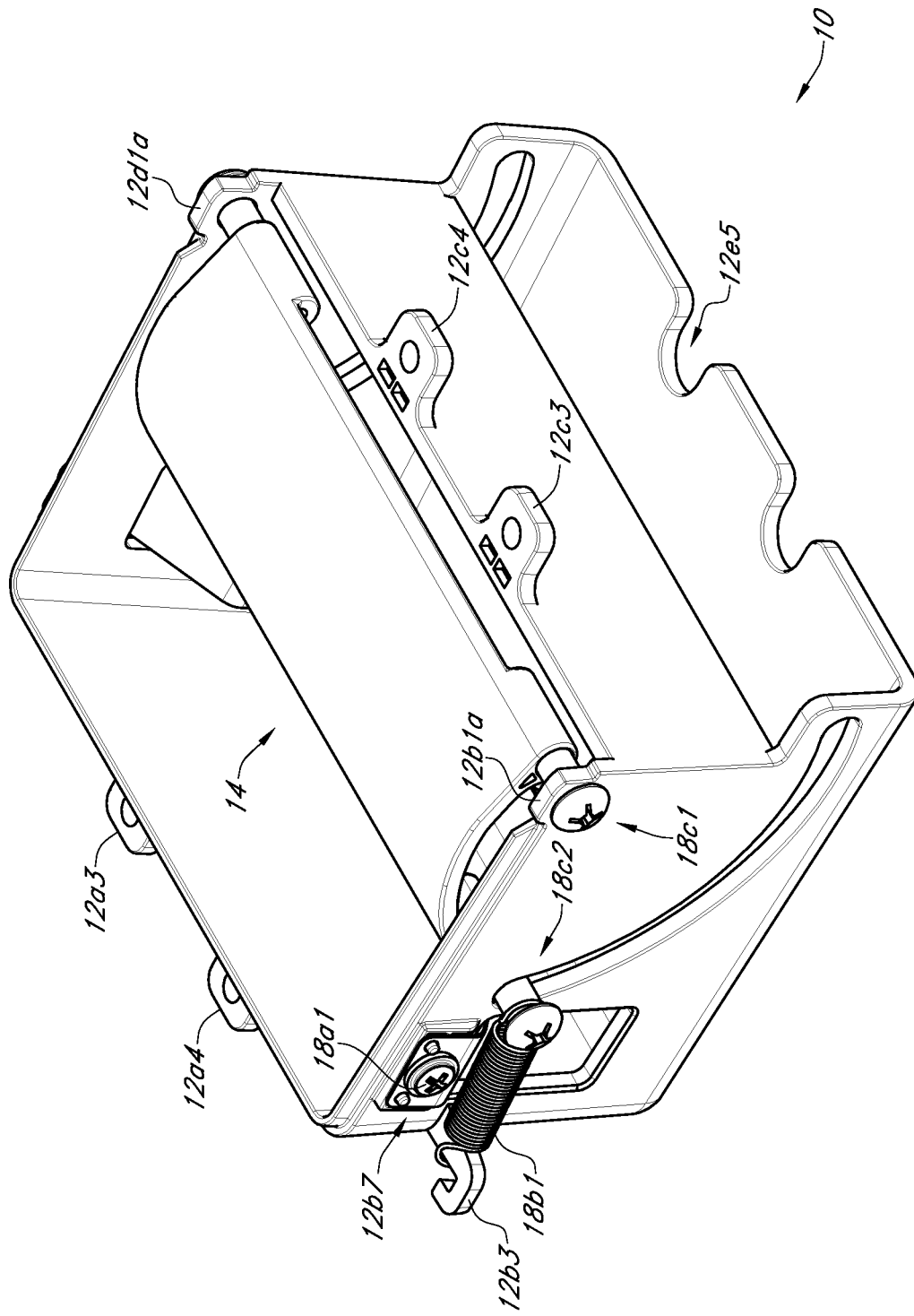
FIG. 10 is a right top rear perspective view of the holder of FIG. 1.

Turning to FIG. 10, depicted therein is a right top rear perspective view of holder assembly 10. Depicted implementation of base portion 12e of container assembly 12 is shown to include notch 12e5. As depicted in implementations, a portion of notch 12e5 is in vertical alignment (when base portion 12e is horizontally oriented) with the center of aperture 12c4a of protrusion 12c4.

Figure 11:
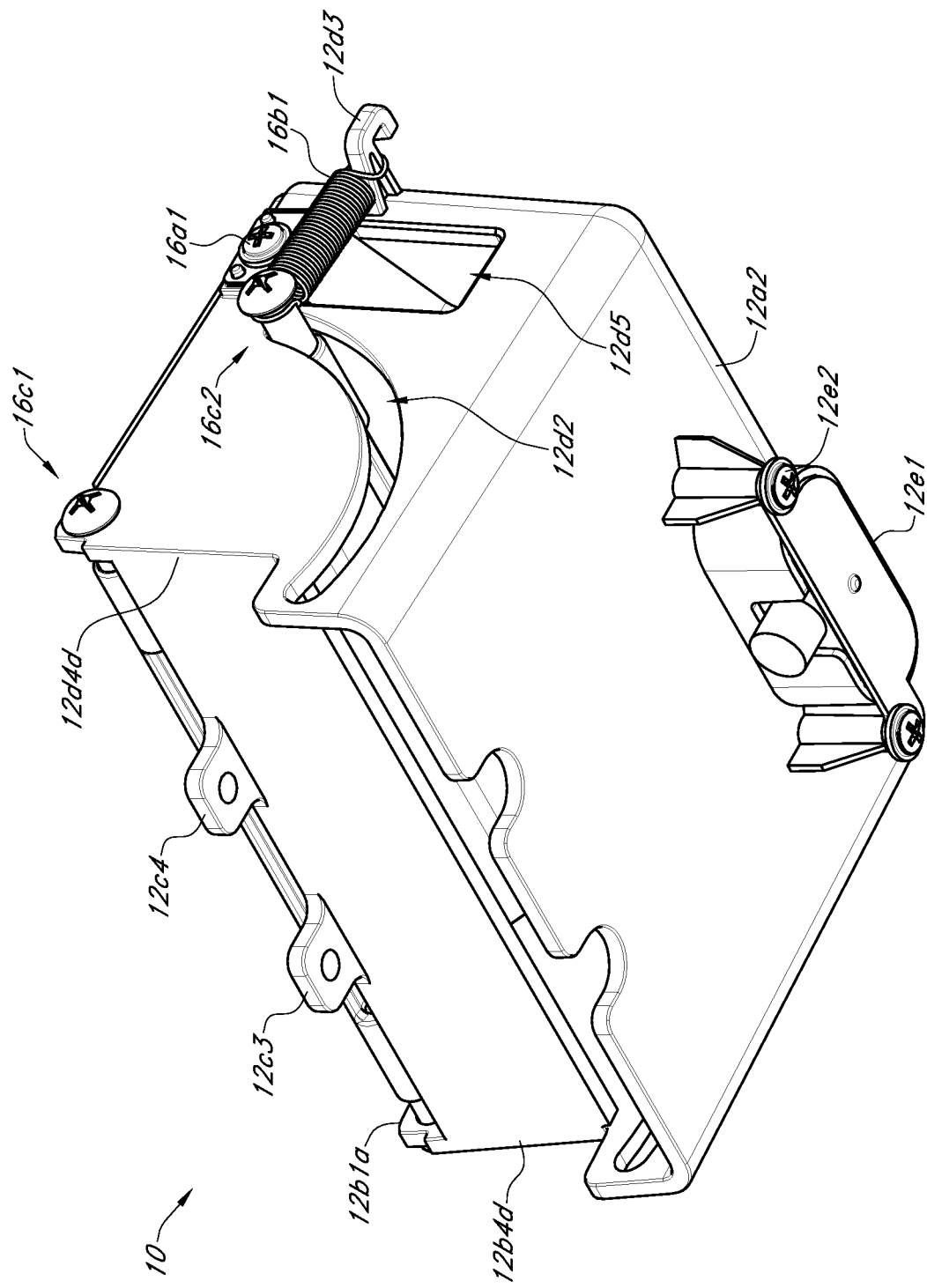
FIG. 11 is a left bottom rear perspective view of the holder of FIG. 1.

Turning to FIG. 11, depicted therein is a left bottom rear perspective view of holder assembly 10.

Figure 12:
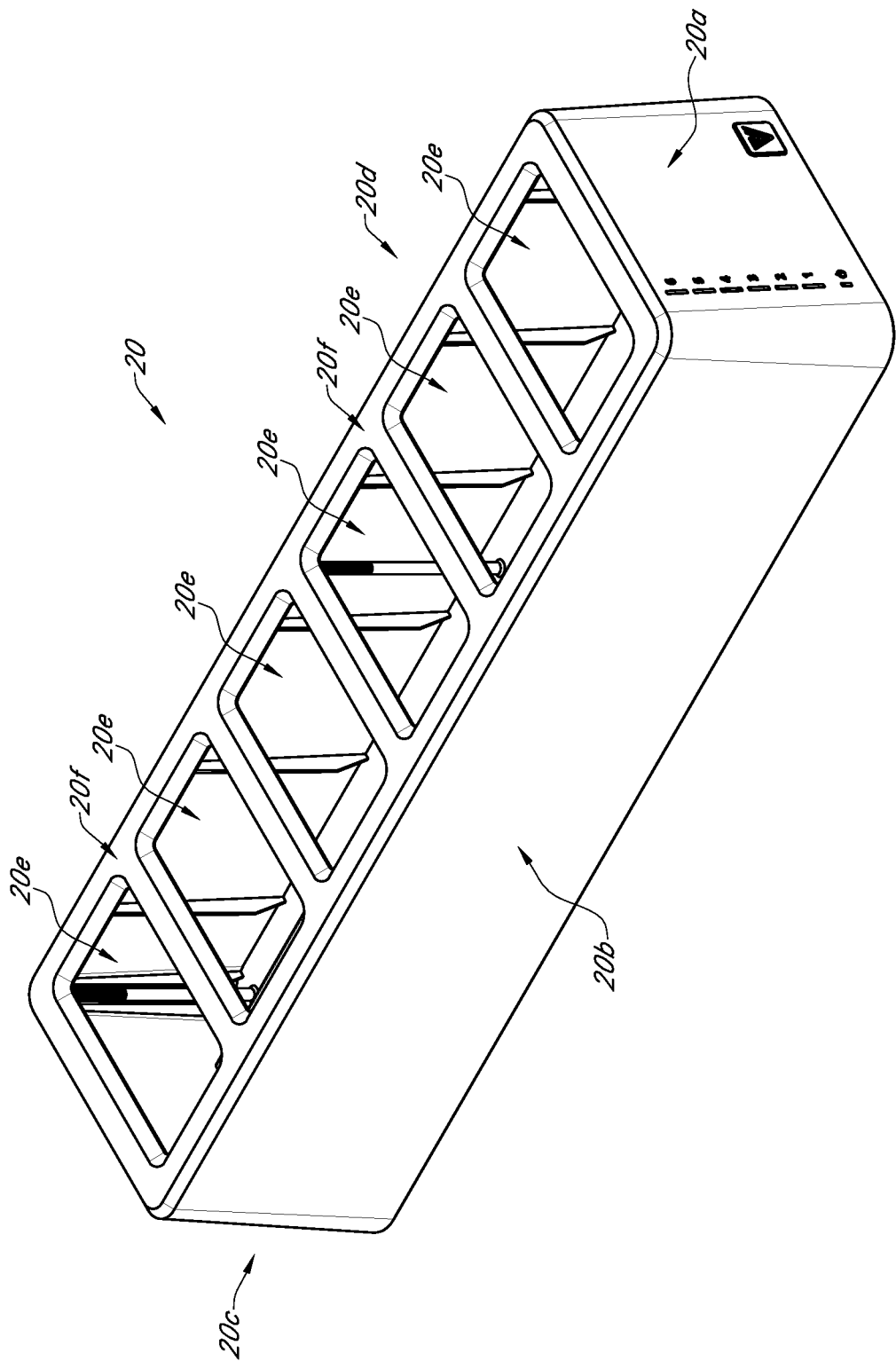
FIG. 12 is a left top front perspective view of a charging station case.

Turning to FIG. 12, depicted therein is a left top front perspective view of housing Depicted implementation of housing 20 is shown to include side 20a, side 20b, side 20c, side 20d, aperture 20e, and upper surface 20f.

Figure 13:
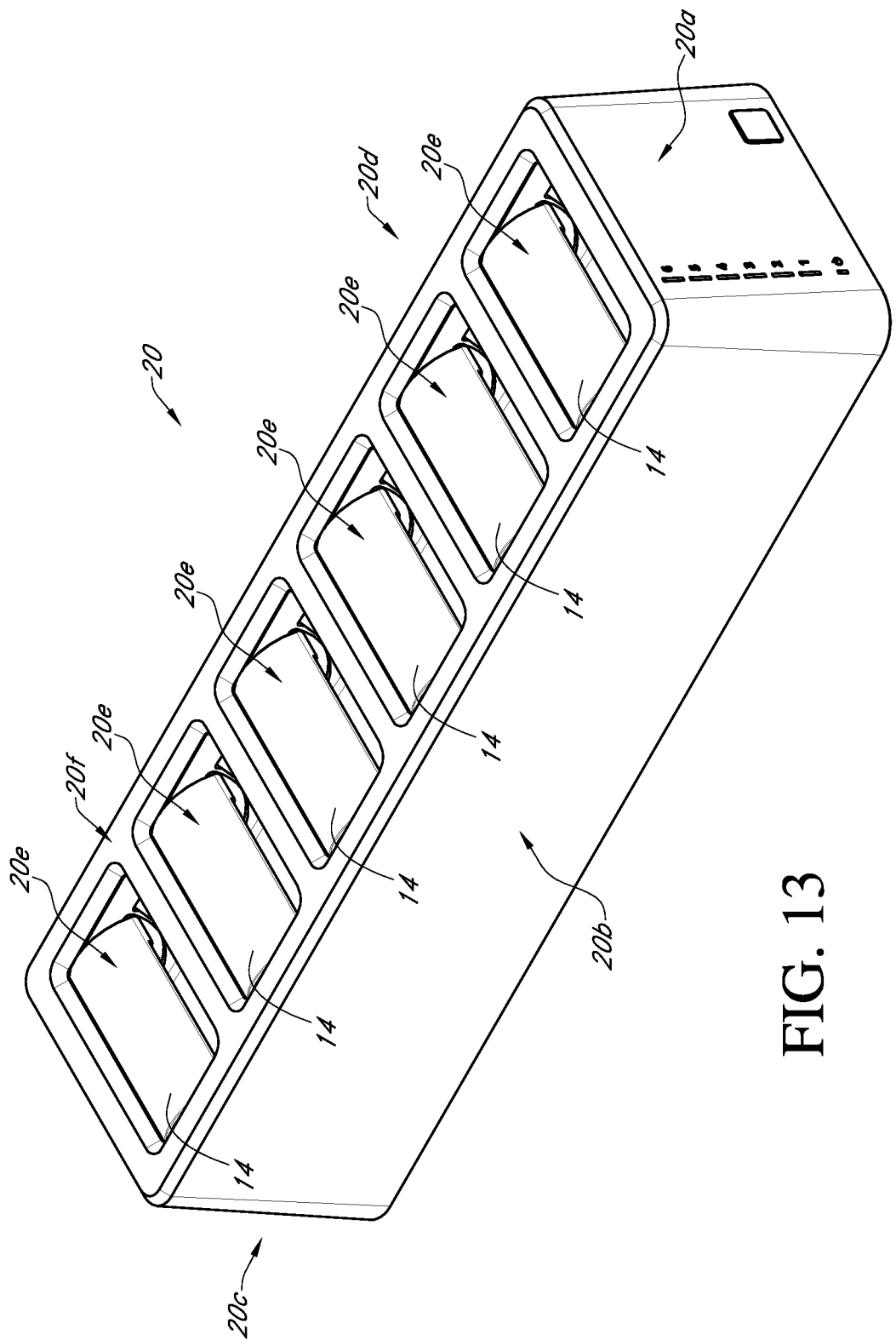
FIG. 13 is a left top front perspective view of the charging station case of FIG. 12 containing a plurality of the holders of FIG. 1 with the plurality of holders each including an adjustable back in a first position.

Turning to FIG. 13, depicted therein is a left top front perspective view of housing containing a plurality of holder assembly 10 with the plurality of holder assembly 10 each including curvilinearly formed semi-rigid sheet assembly 14 in a first position.

Figure 14:
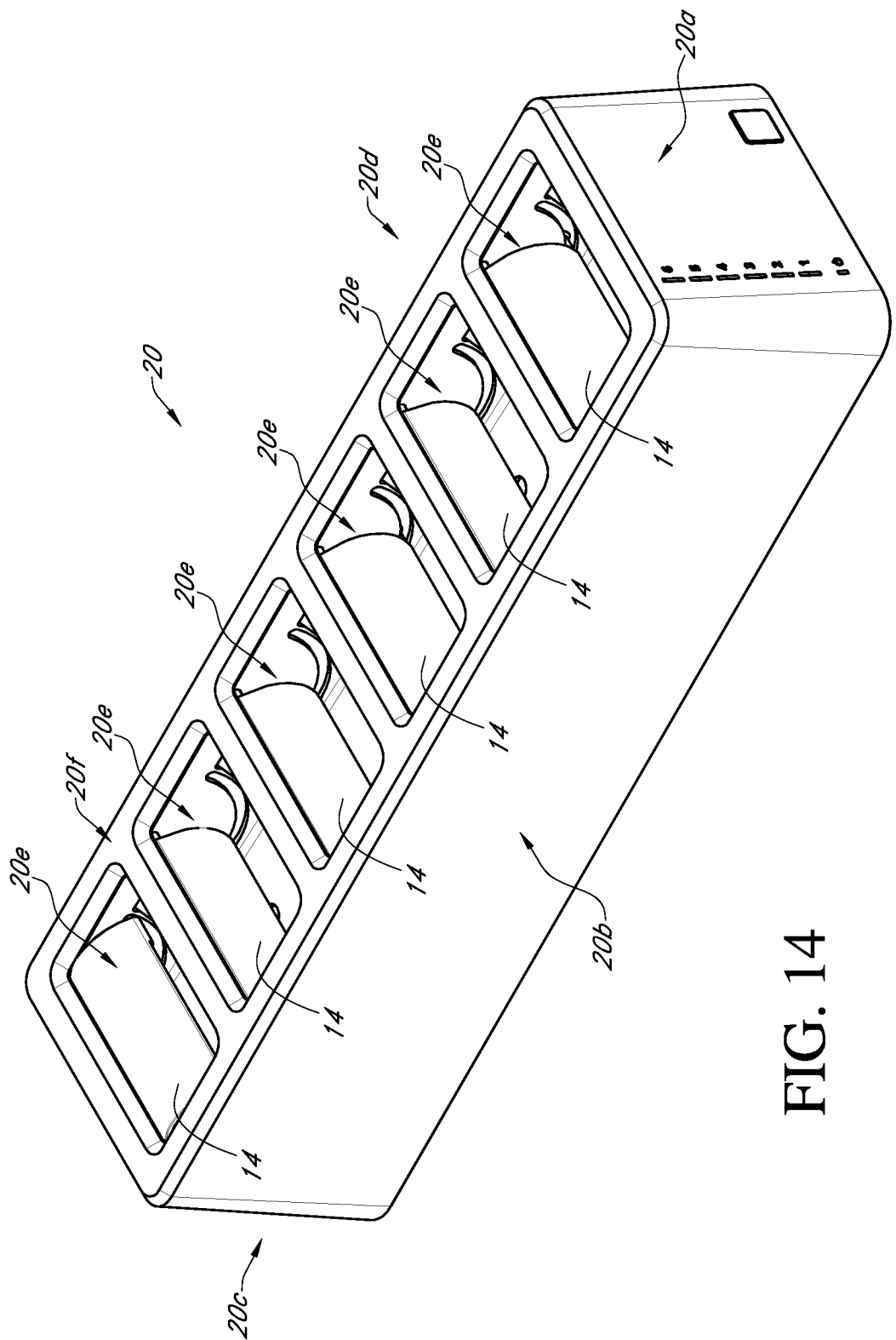
FIG. 14 is a left top front perspective view of the charging station of FIG. 12 containing the plurality of the holders of FIG. 13 with one of the plurality of holders including its adjustable back in the first position of FIG. 13 and other of the plurality of holders with their adjustable backs in other positions.

Turning to FIG. 14, depicted therein is a left top front perspective view of housing containing a plurality of holder assembly 10 with the plurality of holder assembly 10 one including one curvilinearly formed semi-rigid sheet assembly 14 in the first position of FIG. 13 and other curvilinearly formed semi-rigid sheet assembly 14 in a various other positions.

Figure 15A:
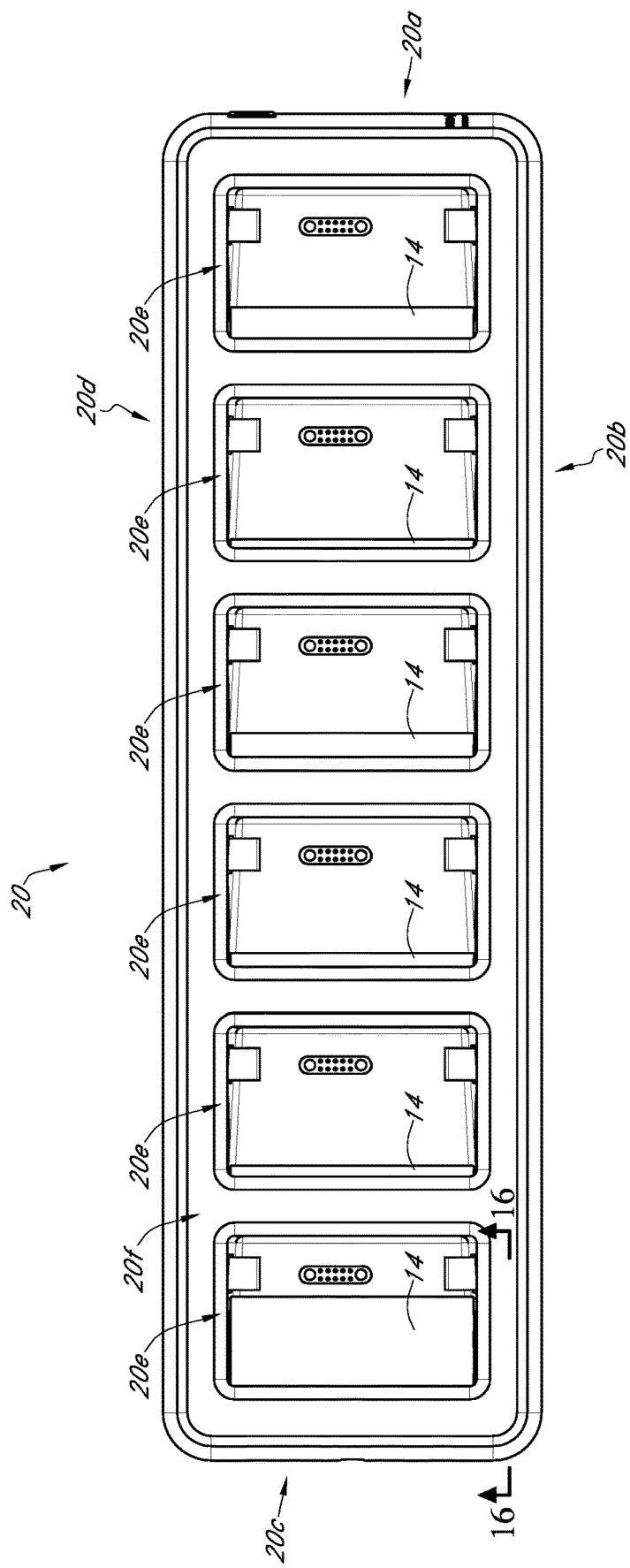
FIG. 15A is a top plan view of the charging station of FIG. 12 containing a plurality of the holders of FIG. 13 with the plurality of the holders with their adjustable backs in the various positions of FIG. 14.

Turning to FIG. 15A, depicted therein is a top plan view of housing 20 containing a plurality of holder assembly 10 with curvilinearly formed semi-rigid sheet assembly 14 in the various positions.

Figure 15B:
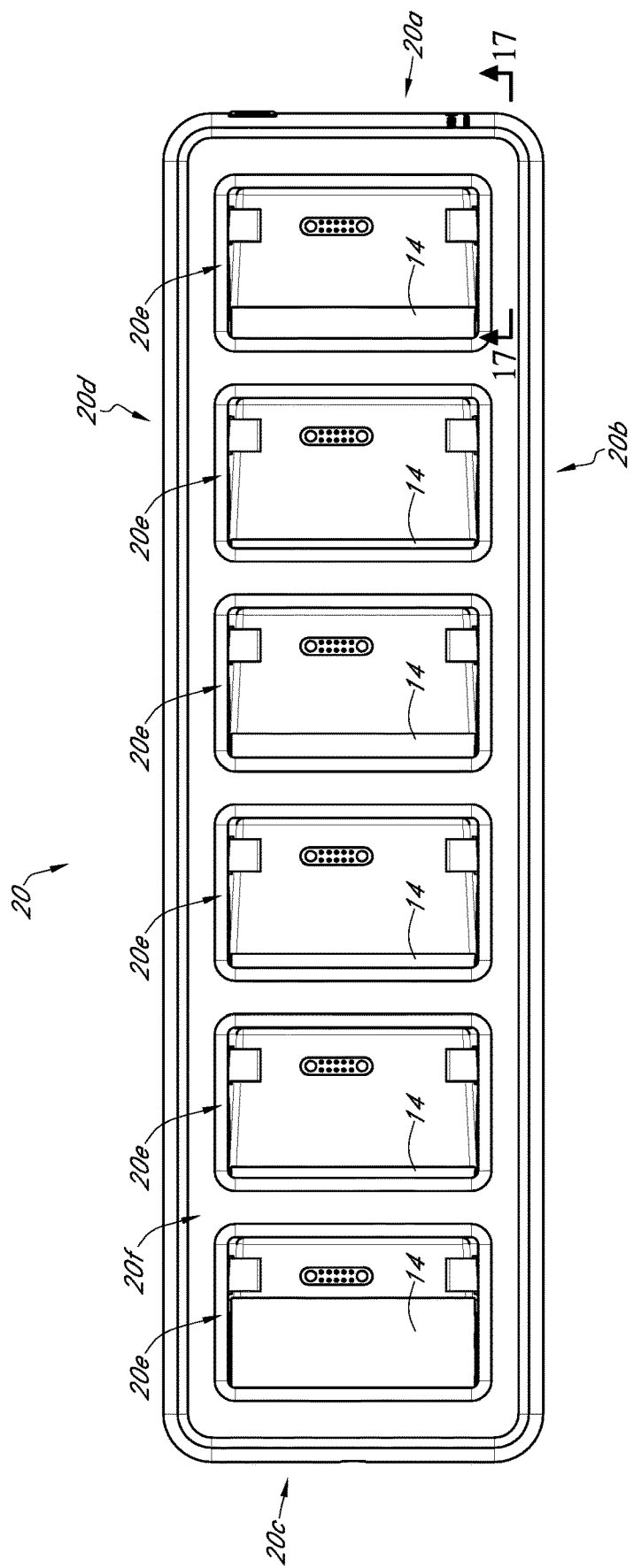
FIG. 15B is a top plan view of the charging station of FIG. 12 containing a plurality of the holders of FIG. 13 with the plurality of the holders with their adjustable backs in the various positions of FIG. 14.

Turning to FIG. 15B, depicted therein is a top plan view of housing 20 containing a plurality of holder assembly 10 with curvilinearly formed semi-rigid sheet assembly 14 in the various positions.

Figure 15C:
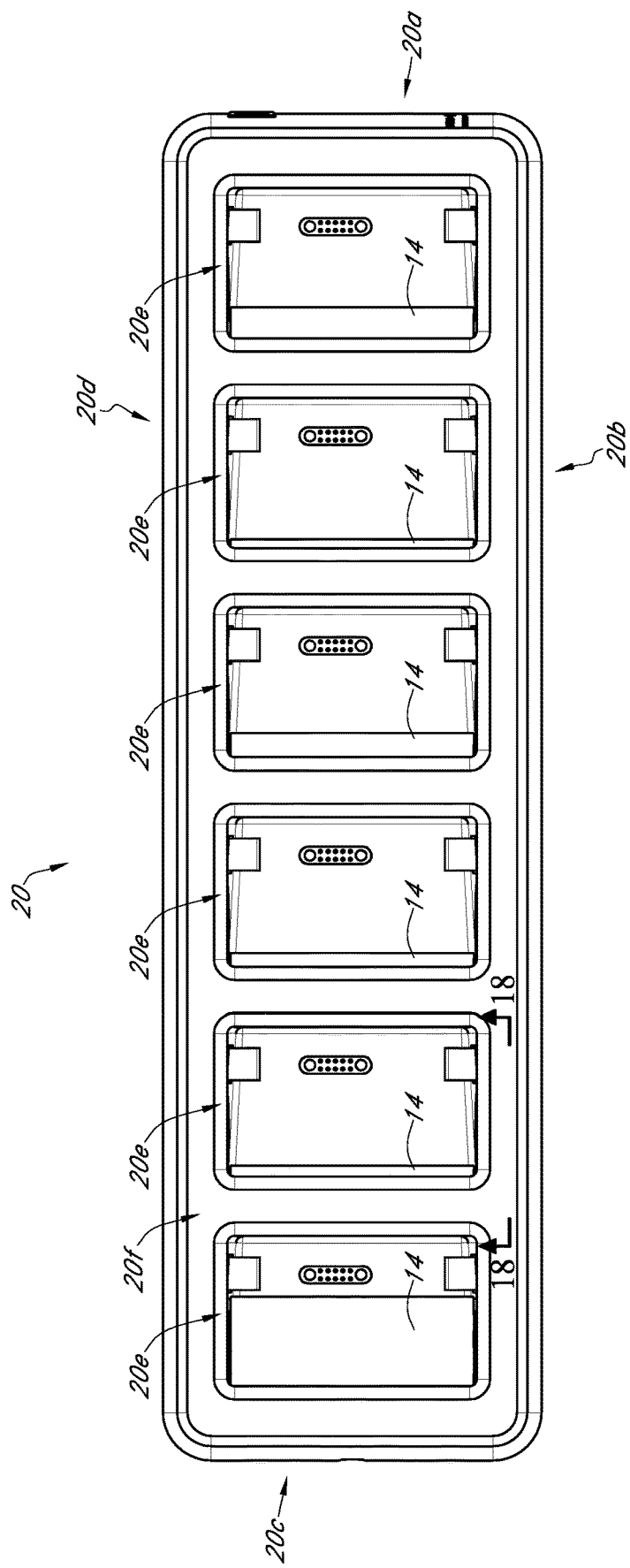
FIG. 15C is a top plan view of the charging station of FIG. 12 containing a plurality of the holders of FIG. 13 with the plurality of the holders with their adjustable backs in the various positions of FIG. 14.

Turning to FIG. 15C, depicted therein is a top plan view of housing 20 containing a plurality of holder assembly 10 with curvilinearly formed semi-rigid sheet assembly 14 in the various positions.

Figure 16:
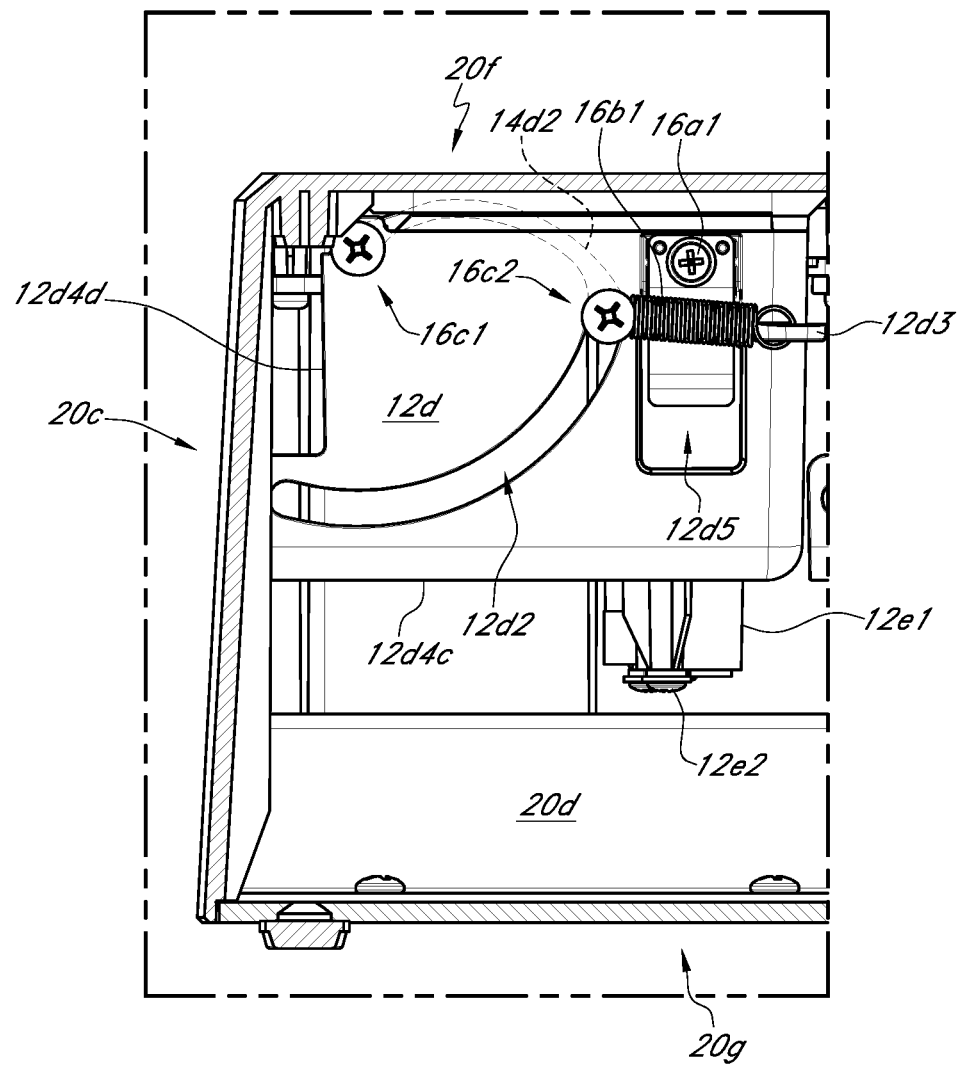
FIG. 16 is a side elevational cross-sectional view of a rear portion of the charging station with adjustable holder back in the first position of FIG. 13 taken along the 16-16 cutline of FIG. 15A.

Turning to FIG. 16, depicted therein is a side elevational cross-sectional view of a rear portion of housing 20 with curvilinearly formed semi-rigid sheet assembly 14 in the first position of FIG. 13 taken along the 16-16 cutline of FIG. 15A. Depicted implementation of housing 20 is shown to include base portion 20g.

Figure 17:
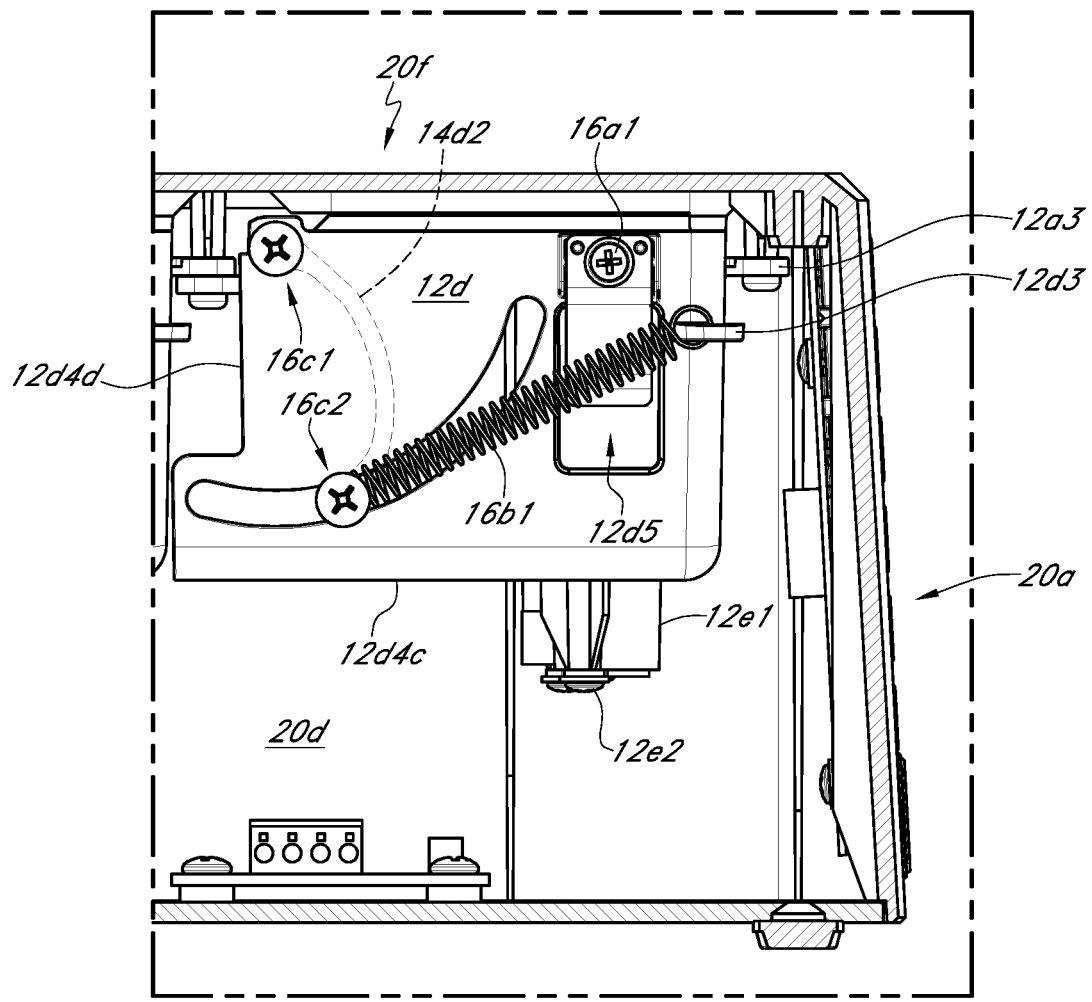
FIG. 17 is a side elevational cross-sectional view of a front portion of the charging station with adjustable holder back in a second position taken along the 17-17 cutline of FIG. 15B.

Turning to FIG. 17, depicted therein is a side elevational cross-sectional view of a front portion of housing 20 with curvilinearly formed semi-rigid sheet assembly 14 in a second position taken along the 17-17 cutline of FIG. 15B.

Figure 18:
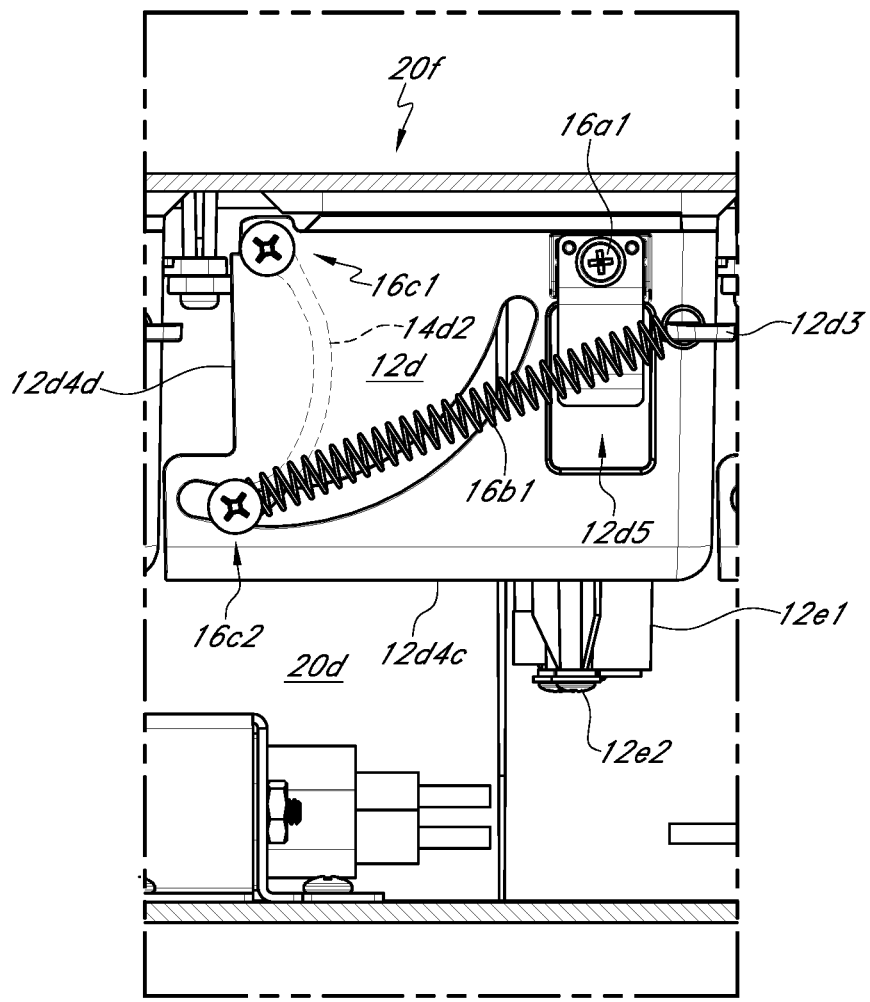
FIG. 18 is a side elevational cross-sectional view of a mid portion of the charging station with adjustable holder back in a third position taken along the 18-18 cutline of FIG. 15C.

Turning to FIG. 18, depicted therein is a side elevational cross-sectional view of a mid portion of housing 20 with curvilinearly formed semi-rigid sheet assembly 14 in a third position taken along the 18-18 cutline of FIG. 15C. As shown in FIGS. 16-18, different portions of curvilinearly formed semi-rigid sheet assembly 14 are closest to side portion 12a as the closest distance from curvilinearly formed semi-rigid sheet assembly 14 to side portion 12a change.

Figure 19:
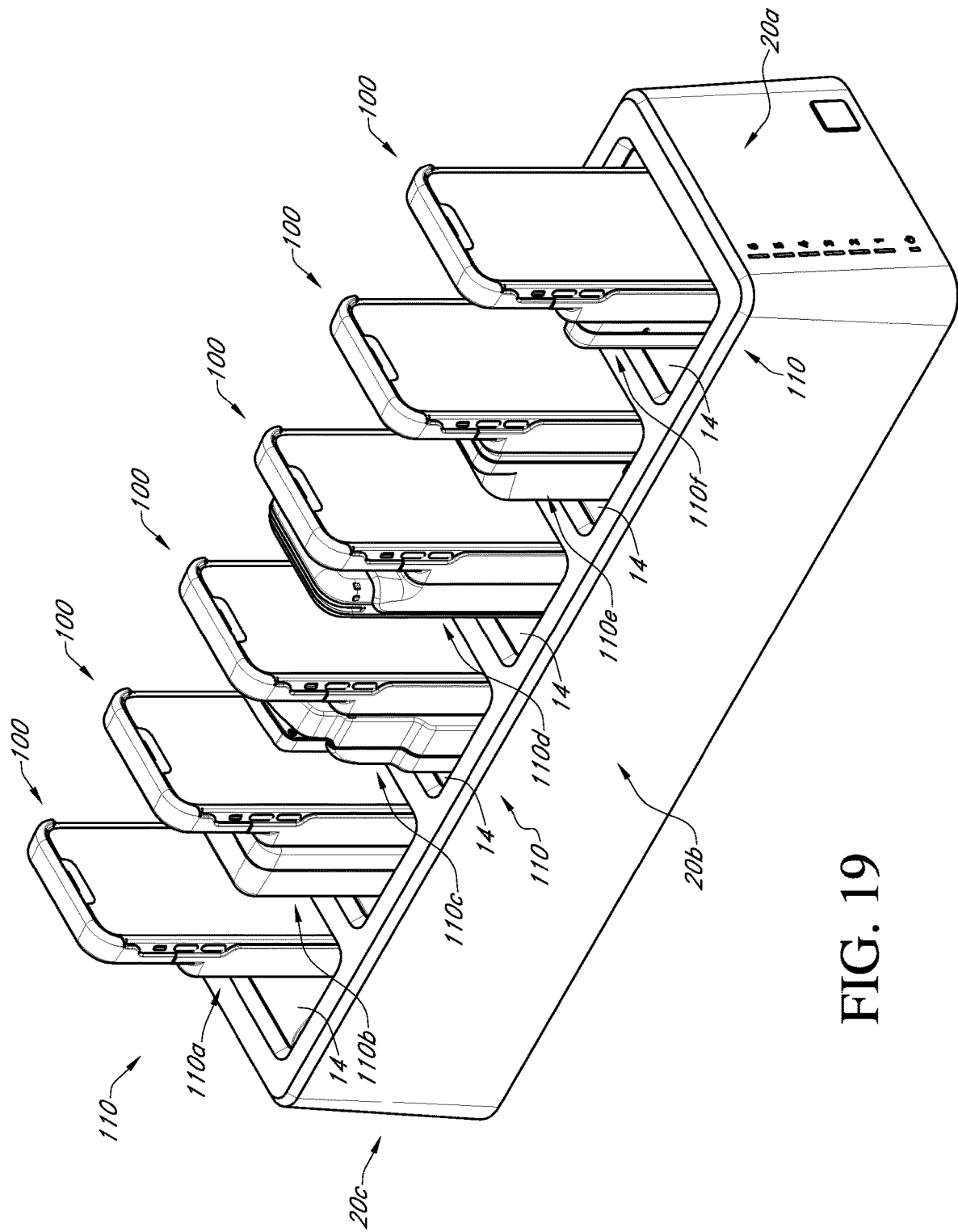
FIG. 19 is a left top front perspective the charging station coupled with a plurality of portable electronic devices with accessory backs of various thicknesses.

Turning to FIG. 19, depicted therein is a left top front perspective of housing 20 being coupled with a plurality of device 100, each being coupled with device backs 110 of various thicknesses.

Depicted implementations of device backs 110 are shown to include device back 110a, device back 110b, device back 110c, device back 110d, device back 110e, and device back 110f. Consequently, various curvilinearly formed semi-rigid sheet assembly 14 of holder assembly 10 coupled in housing 20 are depicted as positioned accordingly to which version of device 100 coupled with a particular device backs 110 of particular dimension.

Figure 20A:
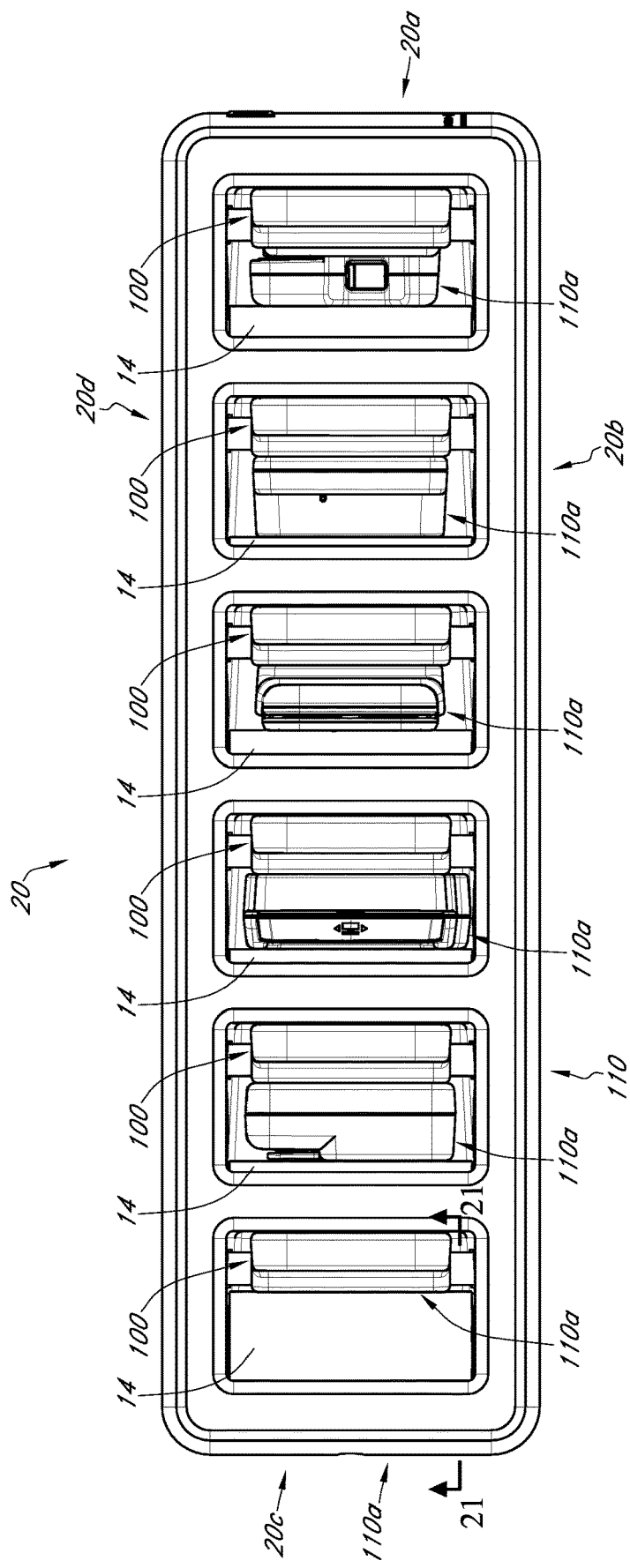
FIG. 20A is a top plan view of the charging station of FIG. 12 containing a plurality of the holders of FIG. 13 with the plurality of the holders with their adjustable backs in the various positions of FIG. 14 to accommodate particular ones of the plurality of portable electronic devices coupled with accessory backs of various thicknesses.

Turning to FIG. 20A, depicted therein is a top plan view of housing 20 being coupled with a plurality of device 100, each being coupled with device backs 110 of various thicknesses.

Figure 20B:
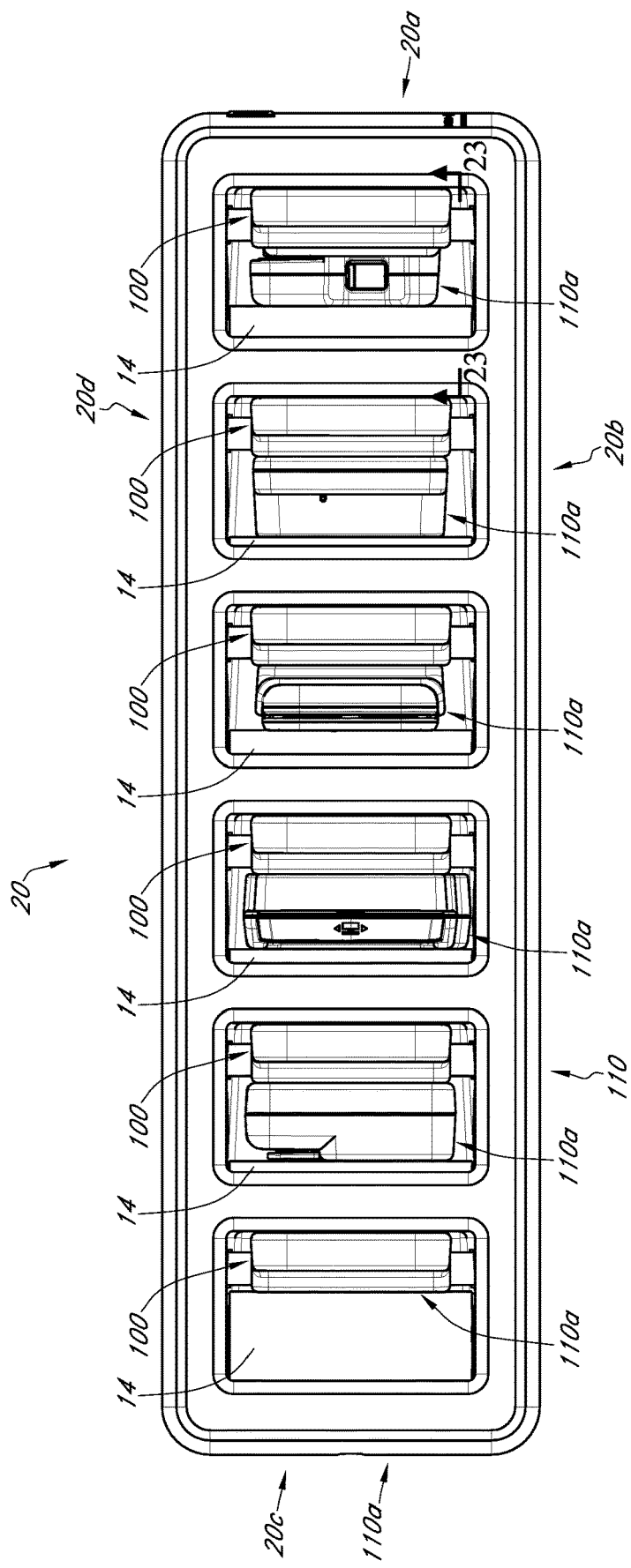
FIG. 20B is a top plan view of the charging station of FIG. 12 containing a plurality of the holders of FIG. 13 with the plurality of the holders with their adjustable backs in the various positions of FIG. 14 to accommodate particular ones of the plurality of portable electronic devices coupled with accessory backs of various thicknesses.

Turning to FIG. 20B, depicted therein is a top plan view of housing 20 being coupled with a plurality of device 100, each being coupled with device backs 110 of various thicknesses.

Figure 20C:
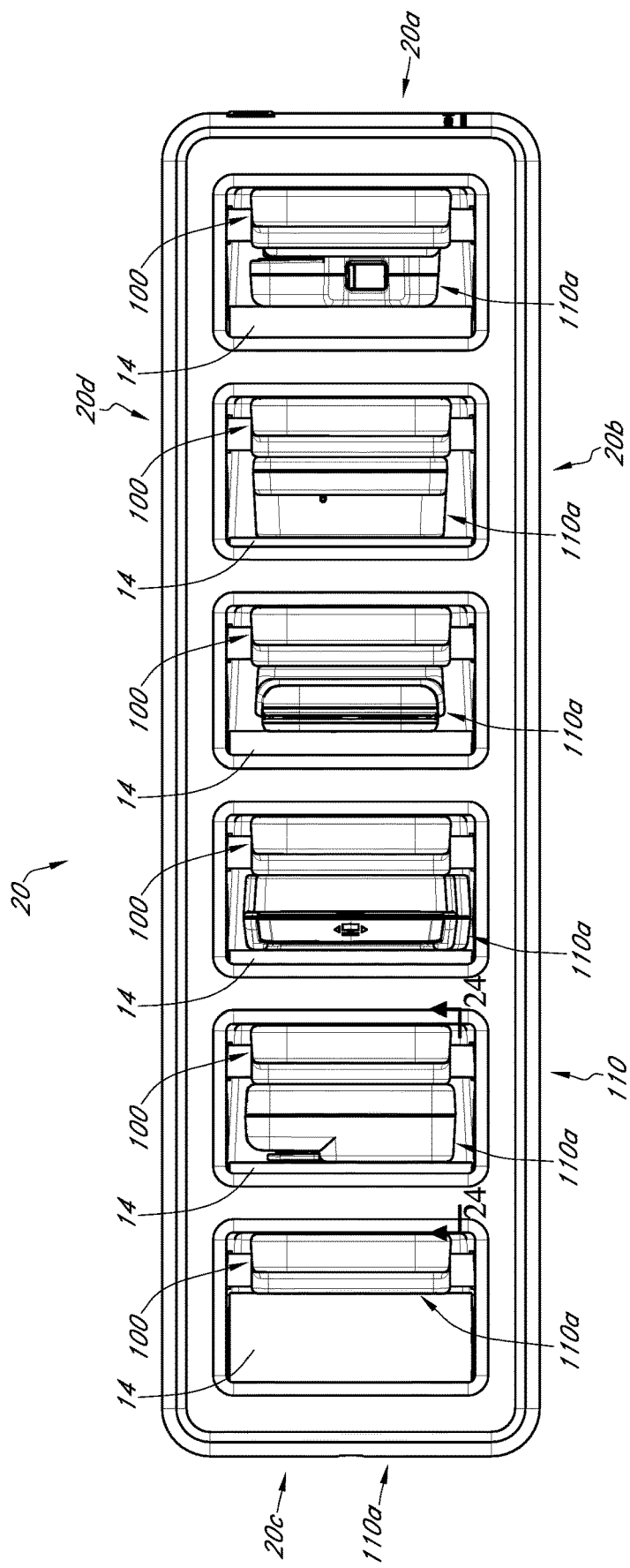
FIG. 20C is a top plan view of the charging station of FIG. 12 containing a plurality of the holders of FIG. 13 with the plurality of the holders with their adjustable backs in the various positions to accommodate particular ones of the plurality of portable electronic devices coupled with accessory backs of various thicknesses.

Turning to FIG. 20C, depicted therein is a top plan view of housing 20 being coupled with a plurality of device 100, each being coupled with device backs 110 of various thicknesses.

Figure 21:
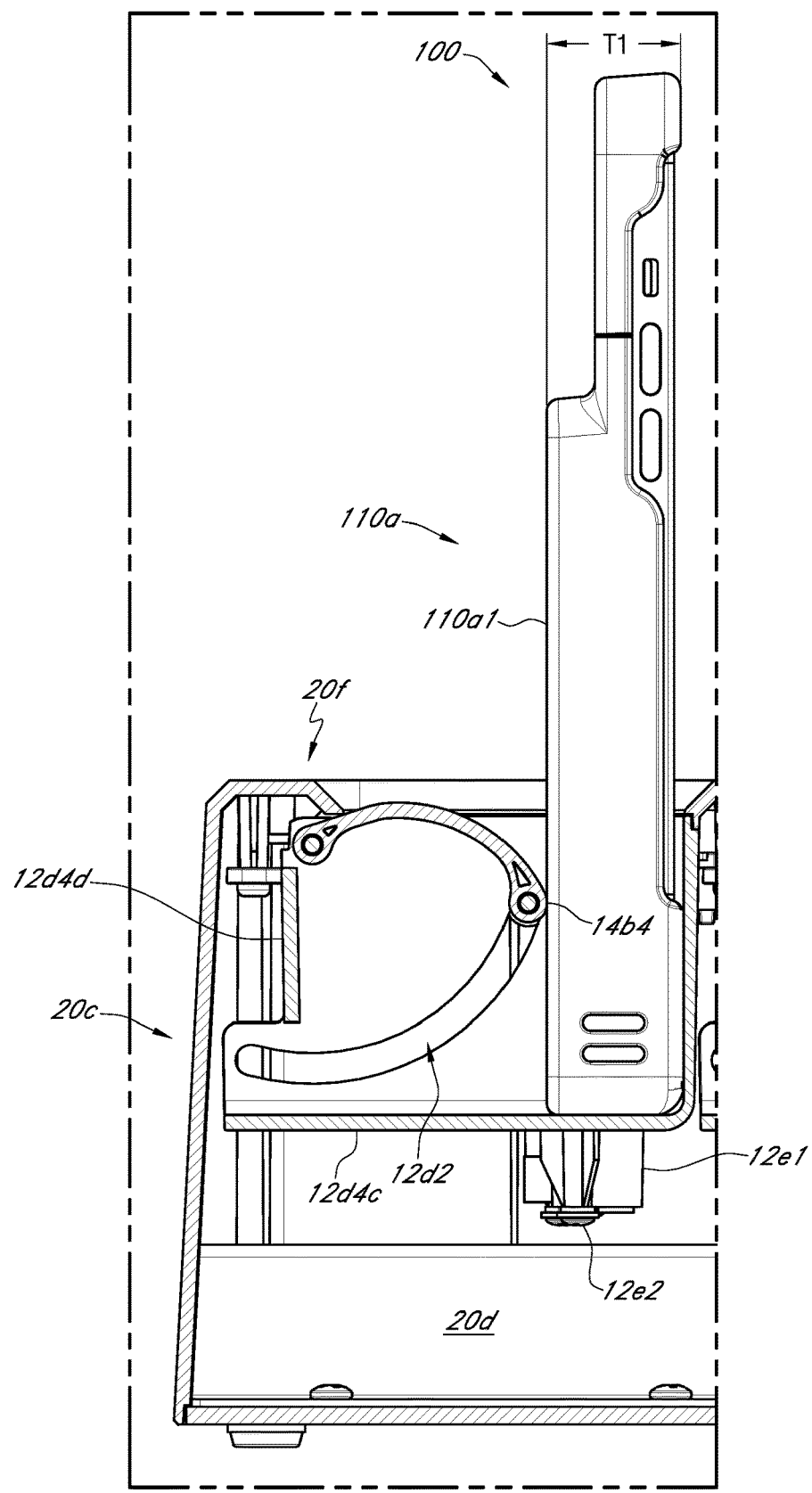
FIG. 21 is a side elevational cross-sectional view of a rear portion of the charging station with adjustable holder back in the first position of FIG. 13 to accommodate the thickness of one of the plurality portable electronic devices taken along the 21-21 cutline of FIG. 20A.

Turning to FIG. 21, depicted therein is a side elevational cross-sectional view of a rear portion of housing 20 with curvilinearly formed semi-rigid sheet assembly 14 of holder assembly 10 holding device back 110a including back surface 110a1 combined to have thickness dimension T1. Depicted implementation of curvilinearly formed semi-rigid sheet assembly 14 is shown in the first position of FIG. 13 accordingly taken along the 21-21 cutline of FIG. 20A.

Figure 22:
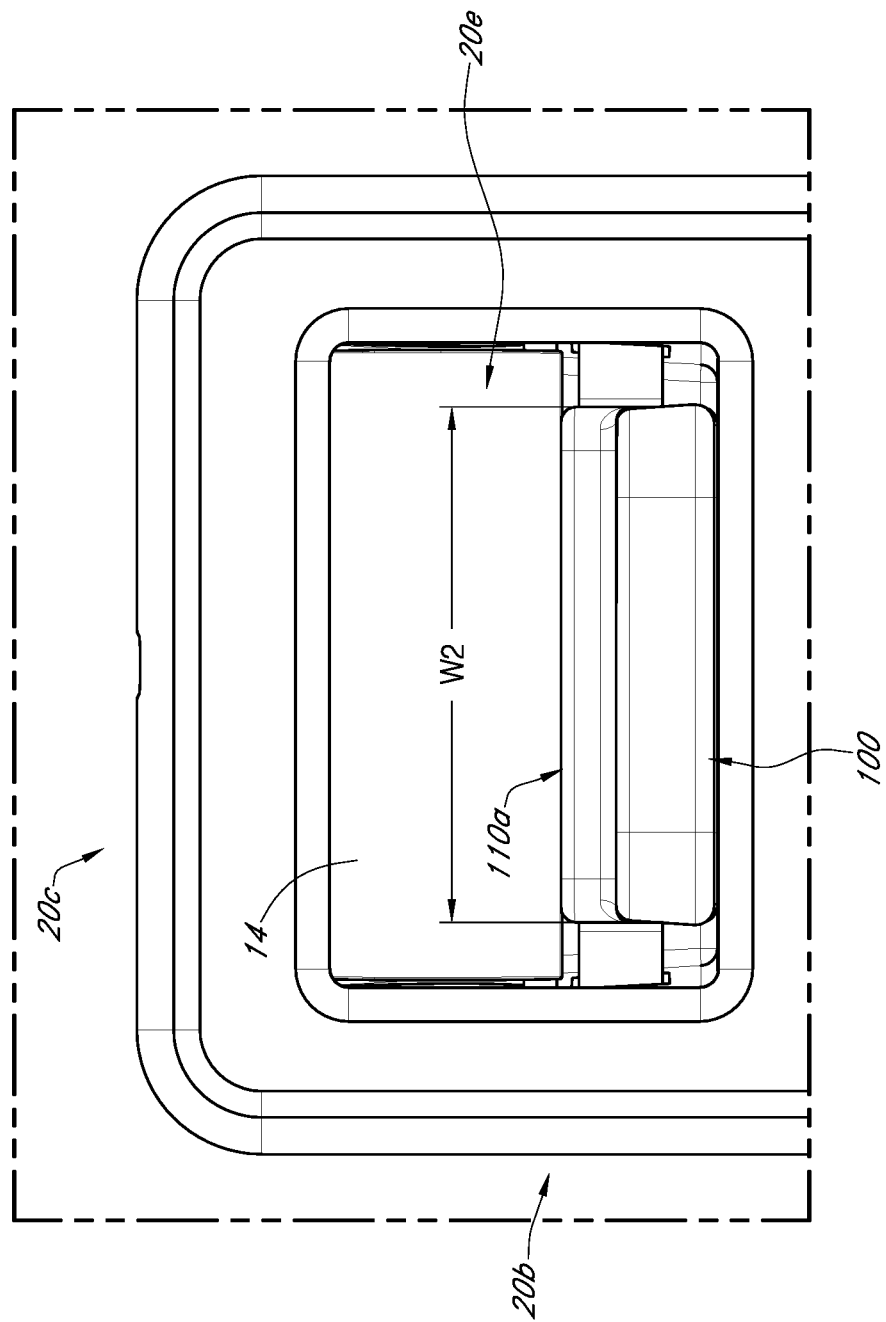
FIG. 22 is a top plan view of the rear portion of the charging station with adjustable holder back in the first position of FIG. 13 to accommodate the thickness of the portable electronic device shown in FIG. 21.

Turning to FIG. 22, depicted therein is a top plan view of the rear portion shown in FIG. 21 of housing 20 coupled with the with one of the plurality of device 100 with width dimension W2 accommodated by side assembly 16 and side assembly 18 of holder assembly 10 and including device back 110a combined to have thickness dimension T1 with curvilinearly formed semi-rigid sheet assembly 14 in the first position of FIG. 13 to accommodate thickness dimension T1.

Figure 23:
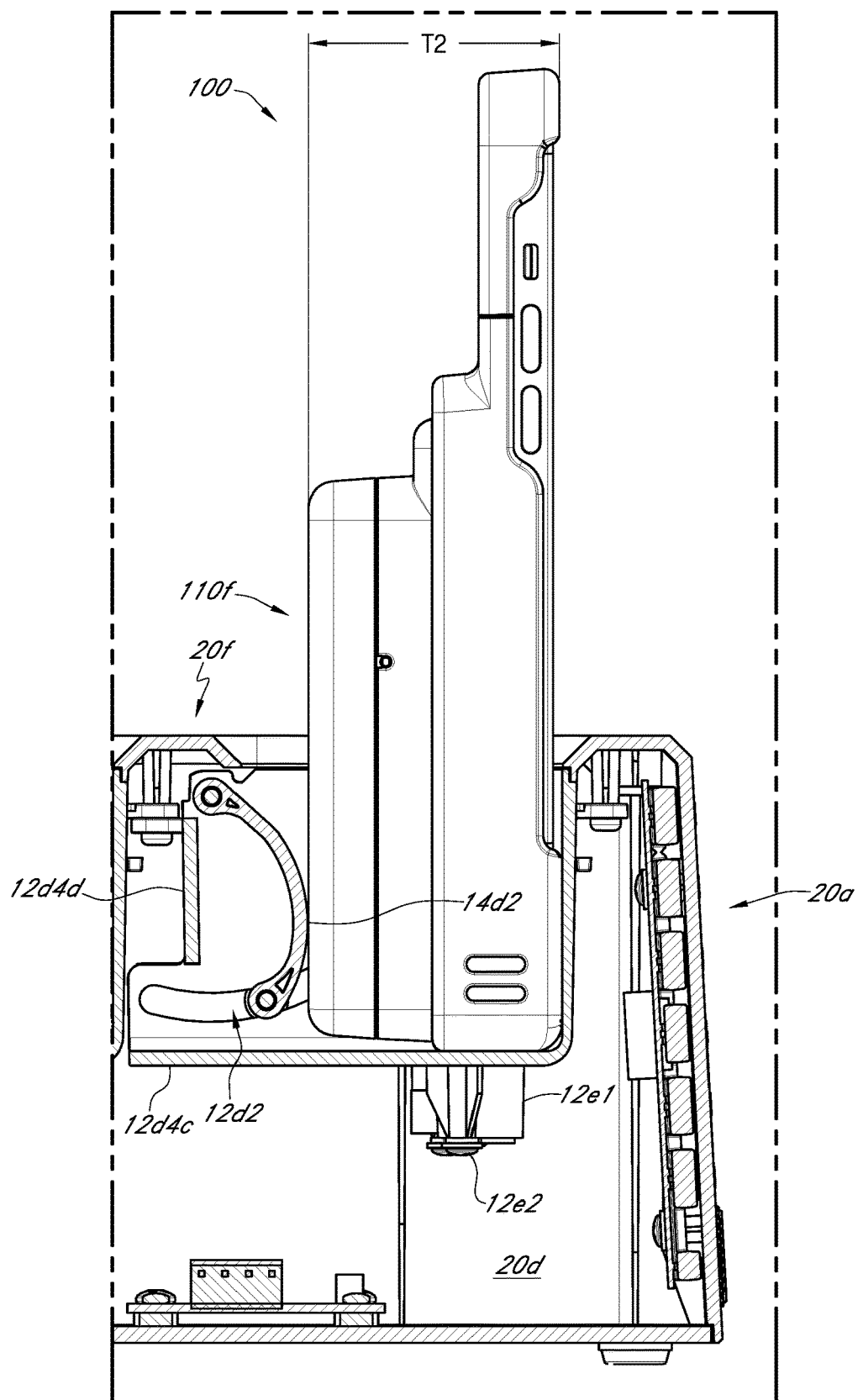
FIG. 23 is a side elevational cross-sectional view of a front portion of the charging station with adjustable holder back relatively close to the second position of FIG. 17 to accommodate the thickness of one of the plurality portable electronic devices taken along the 23-23 cutline of FIG. 20B.

Turning to FIG. 23, depicted therein is a side elevational cross-sectional view of a front portion of housing 20 with curvilinearly formed semi-rigid sheet assembly 14 of holder assembly 10 holding device back 110f including device backs 110 combined to have thickness dimension T2. Depicted implementation of curvilinearly formed semi-rigid sheet assembly 14 is shown in the second position of FIG. 17 to accommodate thickness dimension T2 taken along the 23-23 cutline of FIG. 20B.

Figure 24:
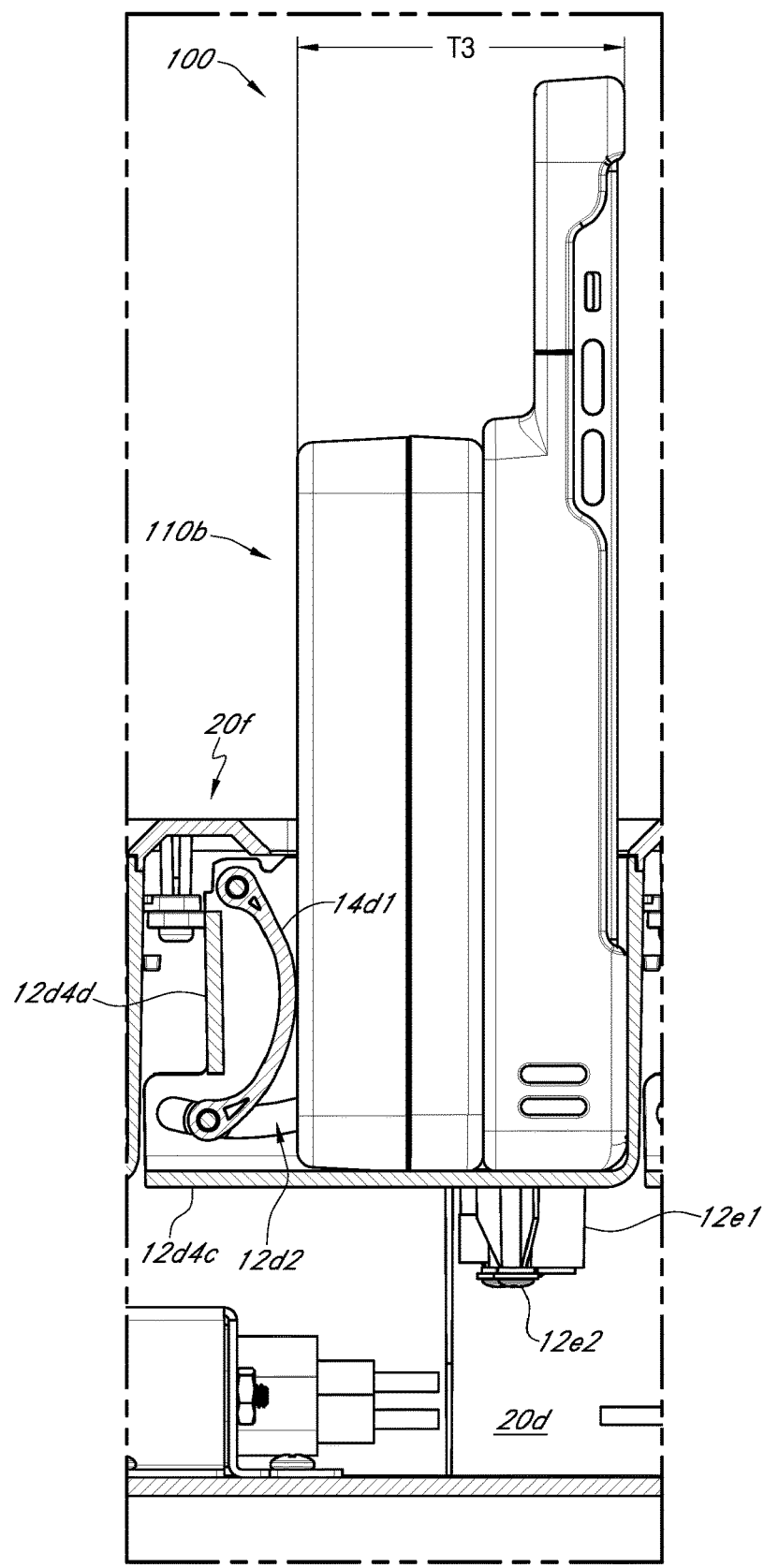
FIG. 24 is a side elevational cross-sectional view of a mid portion of the charging station with adjustable holder in the third position of FIG. 18 to accommodate the thickness of one of the plurality portable electronic devices taken along the 24-24 cutline of FIG. 20C.

Turning to FIG. 24, depicted therein is a side elevational cross-sectional view of a mid portion of housing 20 with curvilinearly formed semi-rigid sheet assembly 14 of holder assembly 10 holding device back 110b including device backs 110 combined to have thickness dimension T3. Depicted implementation of curvilinearly formed semi-rigid sheet assembly 14 is shown in the third position of FIG. 18 to accommodate thickness dimension T3 taken along the 24-24 cutline of FIG. 20C.

Figure 25:
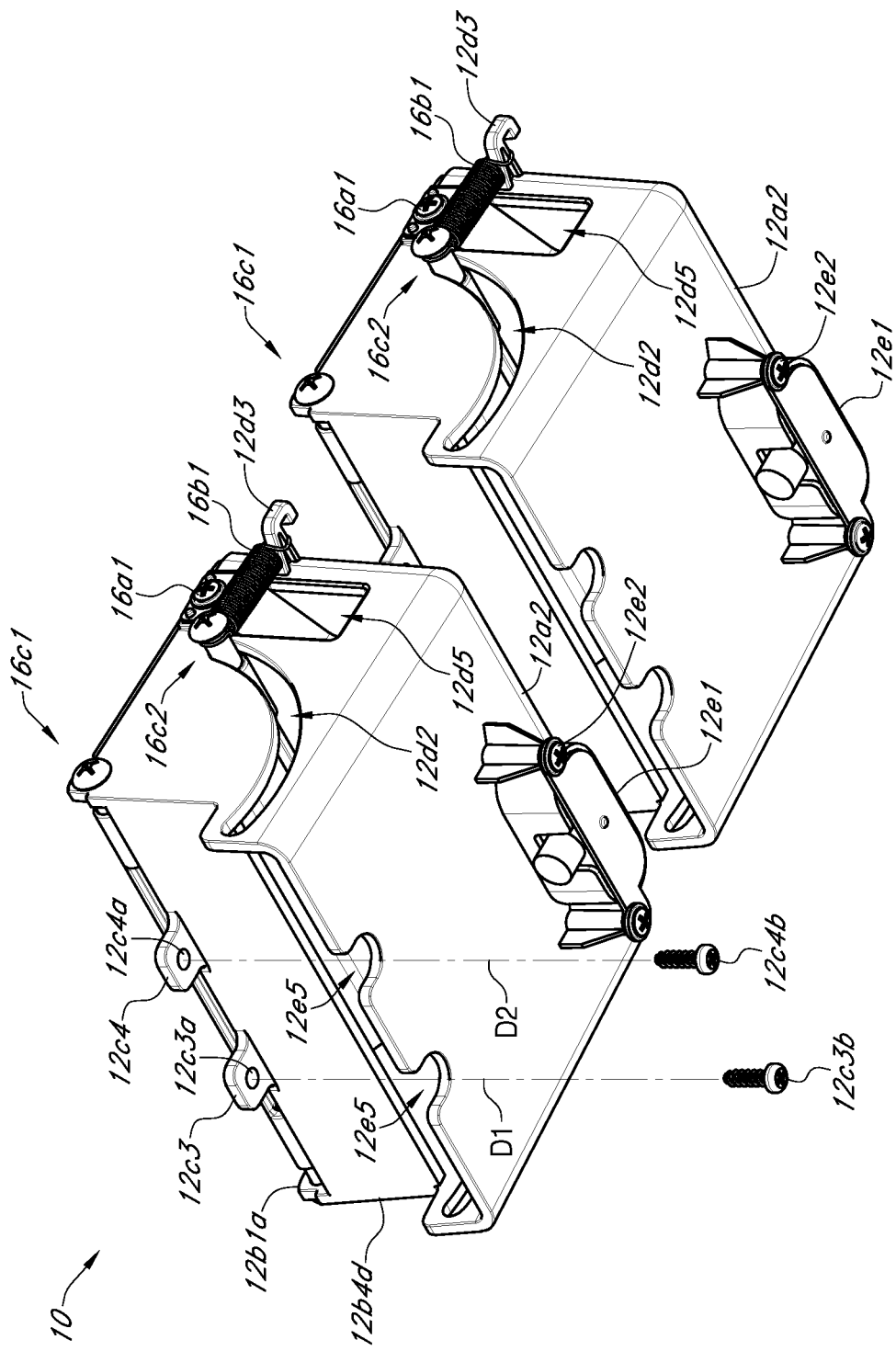
FIG. 25 is a left bottom rear perspective view of multiple instances of the holder of FIG. 1 being uncoupled.

Turning to FIG. 25, depicted therein is a left bottom rear perspective view of multiple instances of holder assembly 10 being uncoupled. As depicted, side portion 12c of container assembly 12 includes threaded fastener 12c3b and threaded fastener 12c4b.

Figure 26:
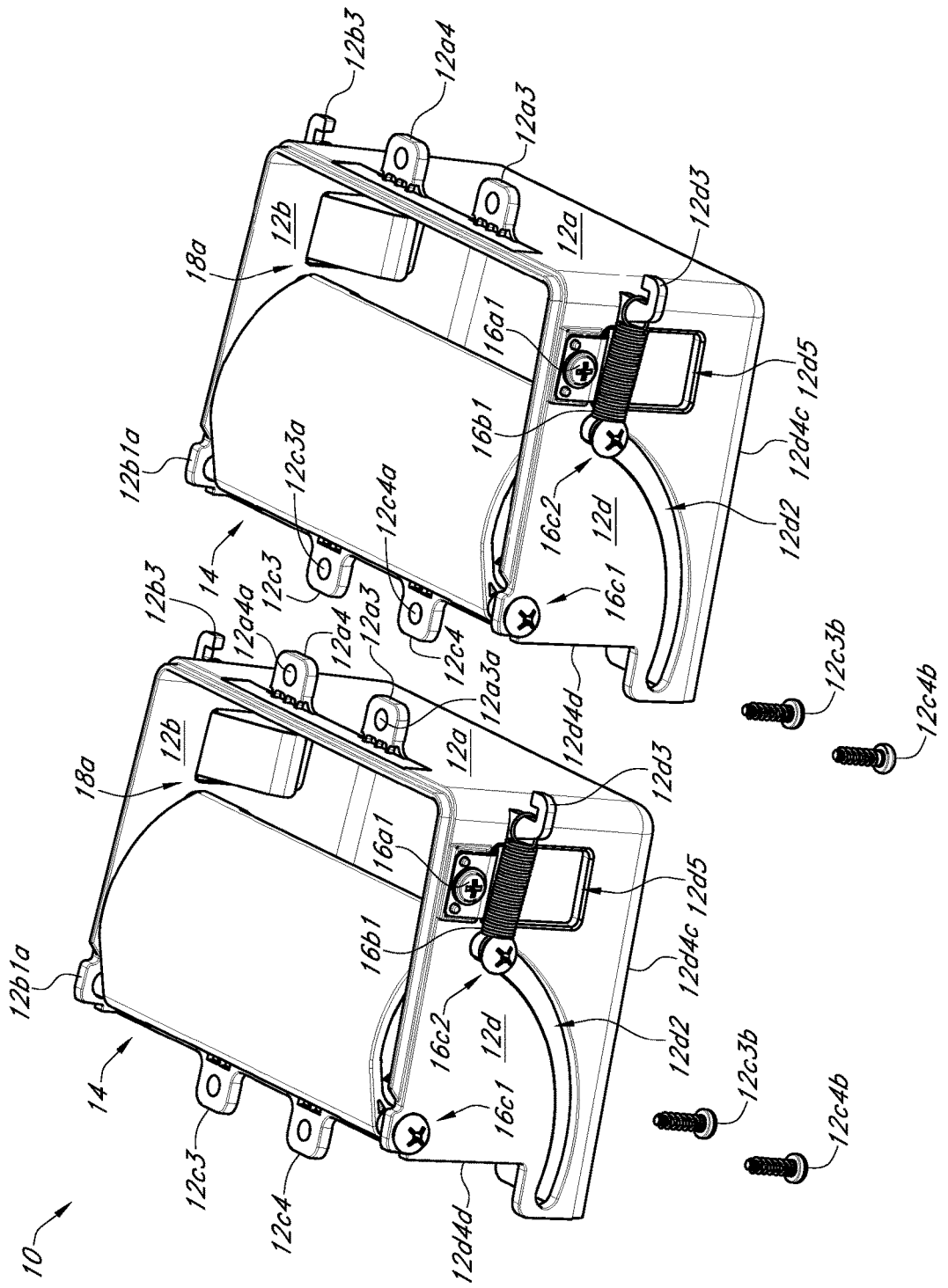
FIG. 26 is a left top front perspective view of multiple instances of the holder of FIG. 1 being uncoupled.

Turning to FIG. 26, depicted therein is a left top front perspective view of multiple instances of holder assembly 10 being uncoupled.

Figure 27:
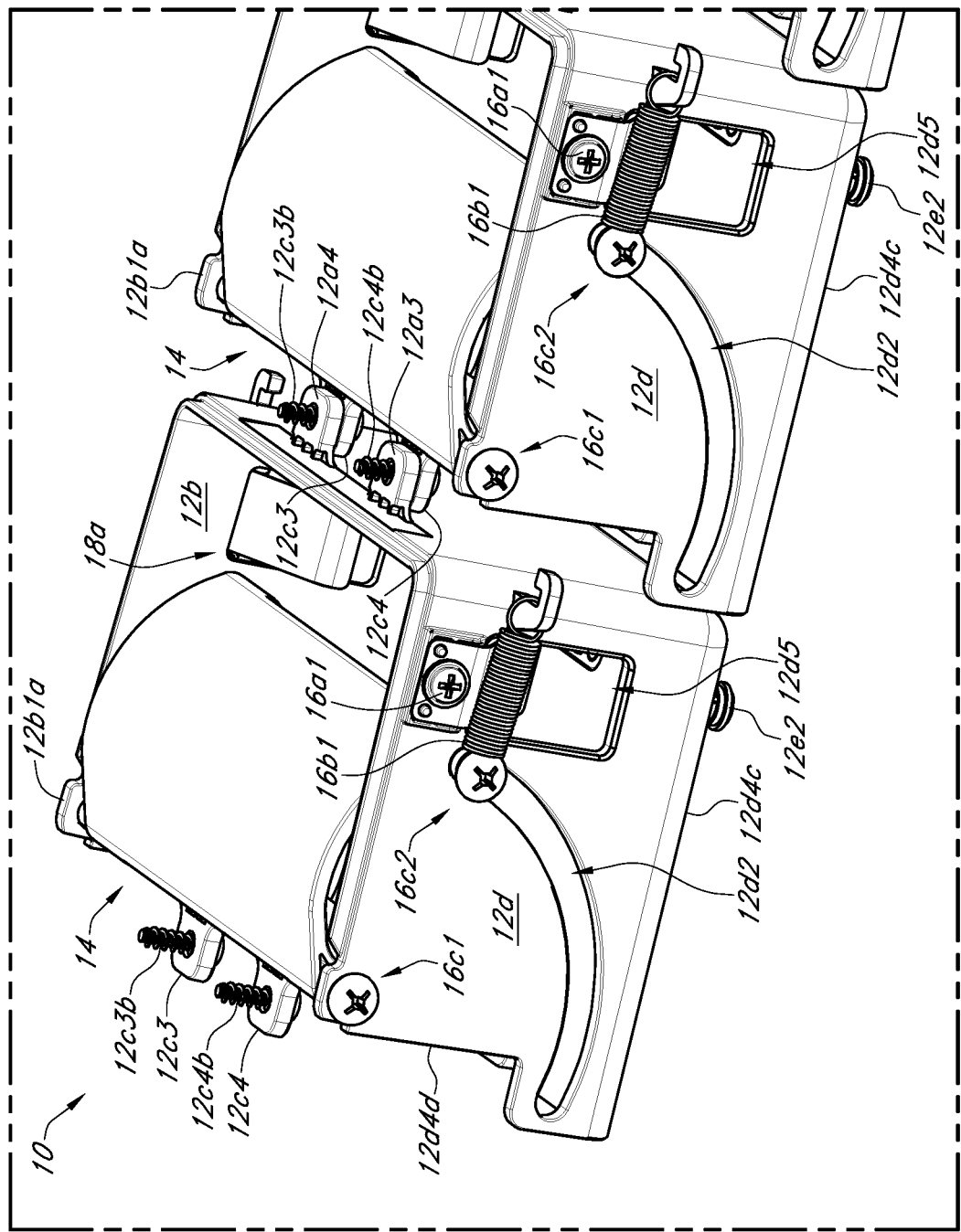
FIG. 27 is a left top front perspective view of multiple instances of the holder of FIG. 1 being coupled together.

Turning to FIG. 27, depicted therein is a left top front perspective view multiple instances of holder assembly 10 being uncoupled.

Figure 28:
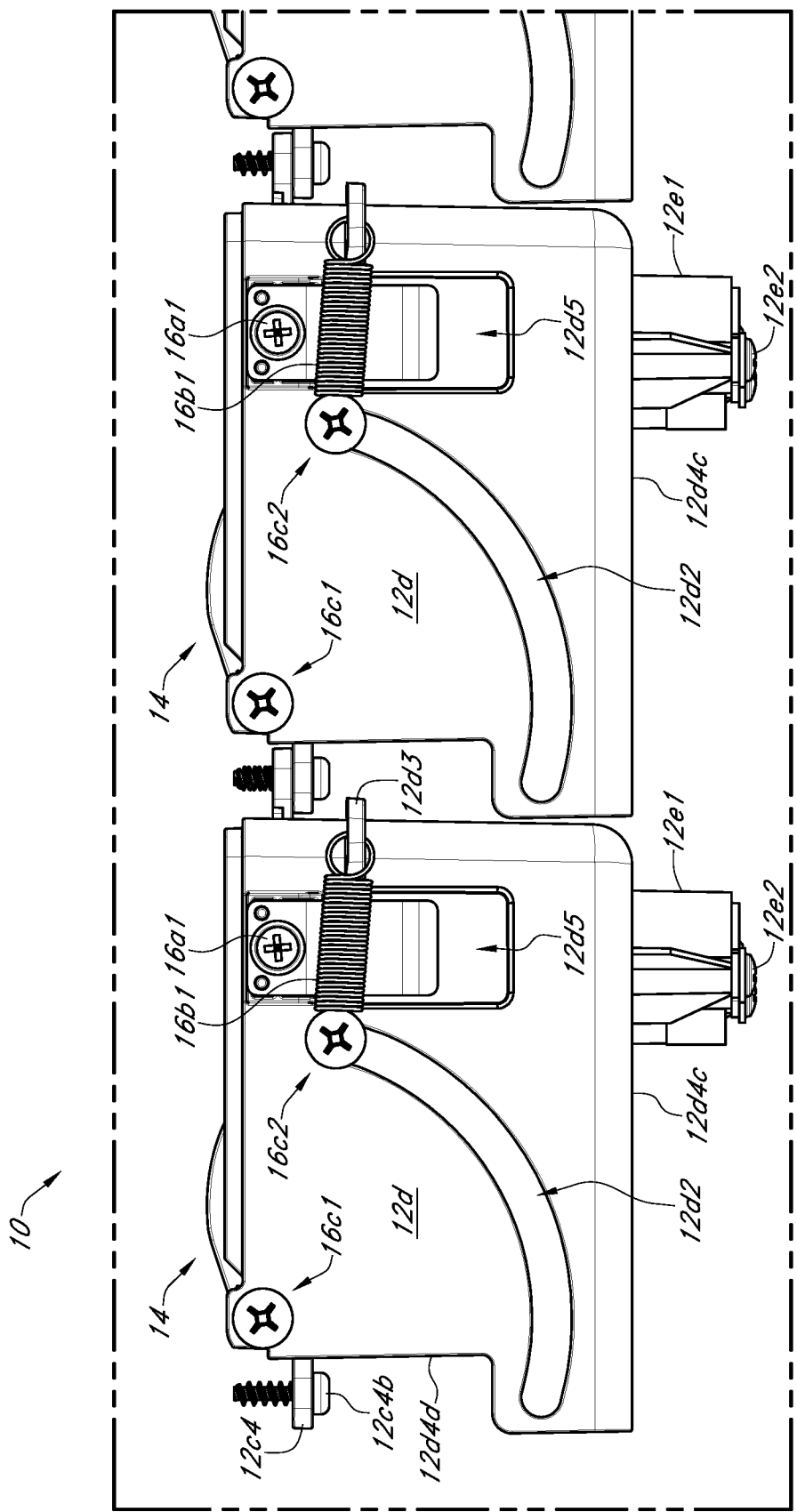
FIG. 28 is a side elevational view of multiple instances of the holder of FIG. 1.

Turning to FIG. 28, depicted therein is a side elevational view of multiple instances of holder assembly 10 of FIG. 1.

Figure 29:
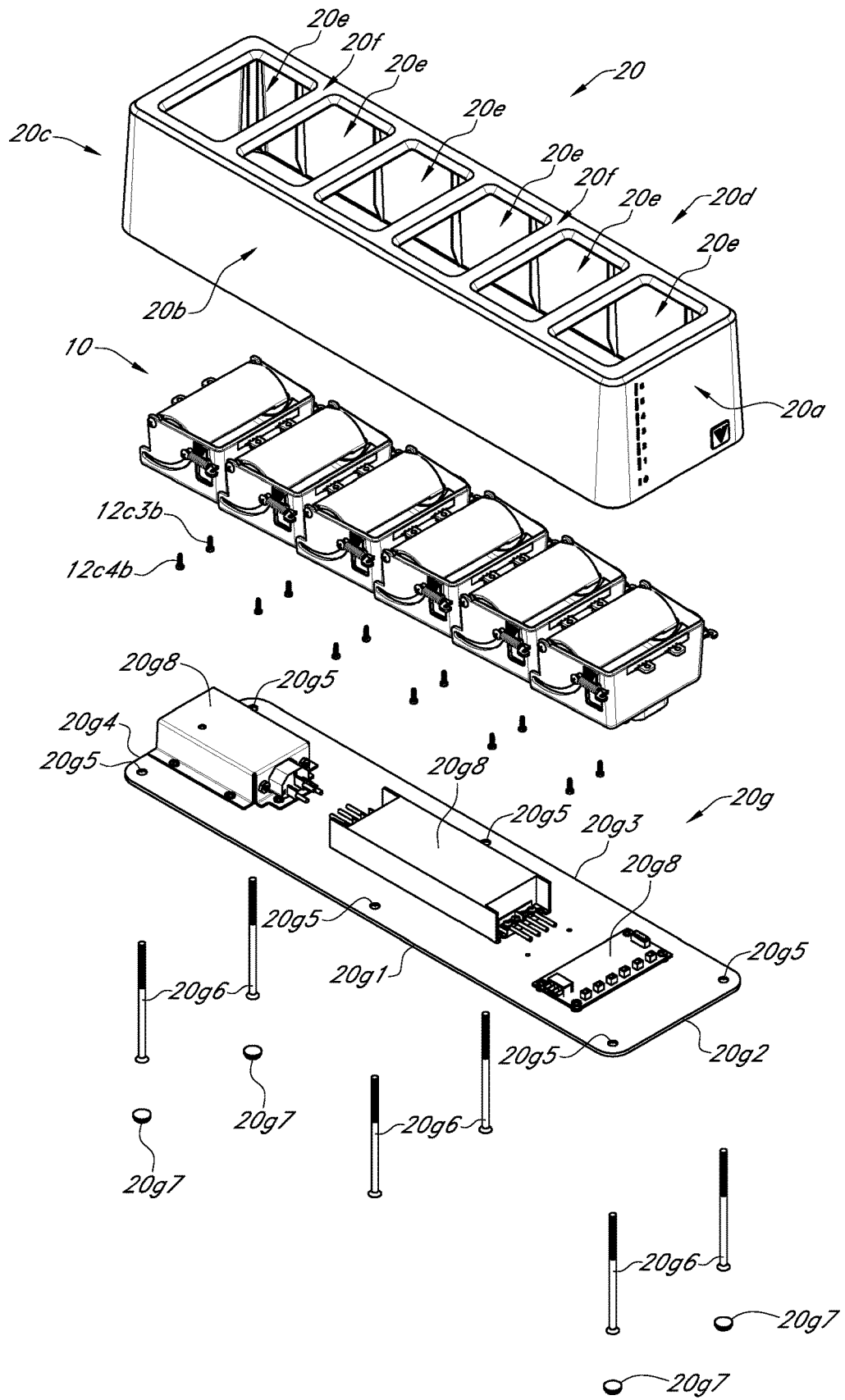
FIG. 29 is a left top front perspective exploded view of the charging station of FIG. 13.

Turning to FIG. 29, depicted therein is a left top front perspective exploded view of housing 20 with multiple instances of holder assembly 10. As depicted, base portion 20g of housing 20 includes side 20g1, side 20g2, side 20g3, side 20g4, aperture 20g5, fastener cover 20g7, and electronics 20g8.

Figure 30:
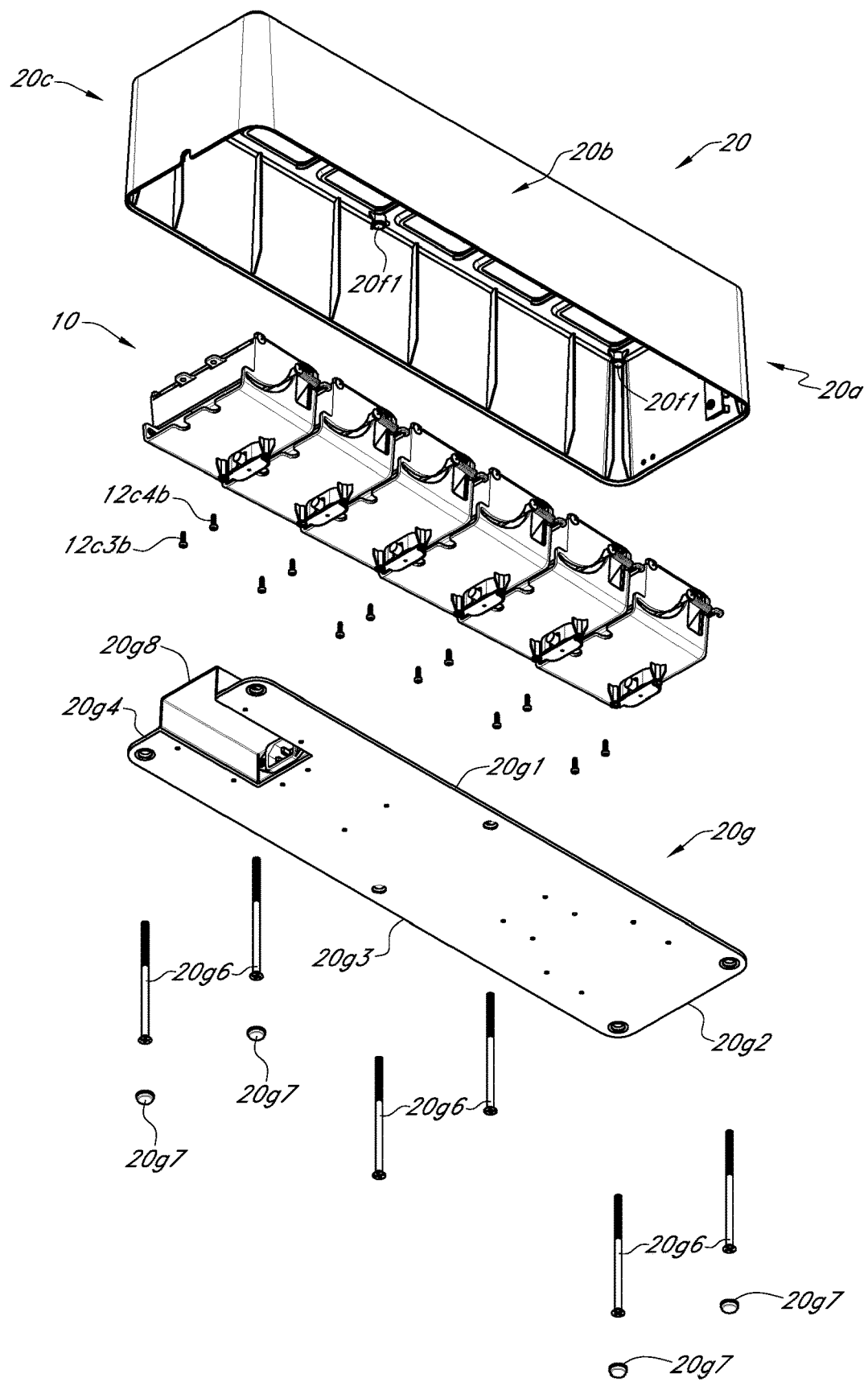
FIG. 30 is a left bottom rear perspective exploded view of the charging station of FIG. 13.

Turning to FIG. 30, depicted therein is a left bottom rear perspective exploded view of housing 20 with multiple instances of holder assembly 10. As depicted, upper surface 20f of housing 20 includes aperture 20f1.

Figure 31:
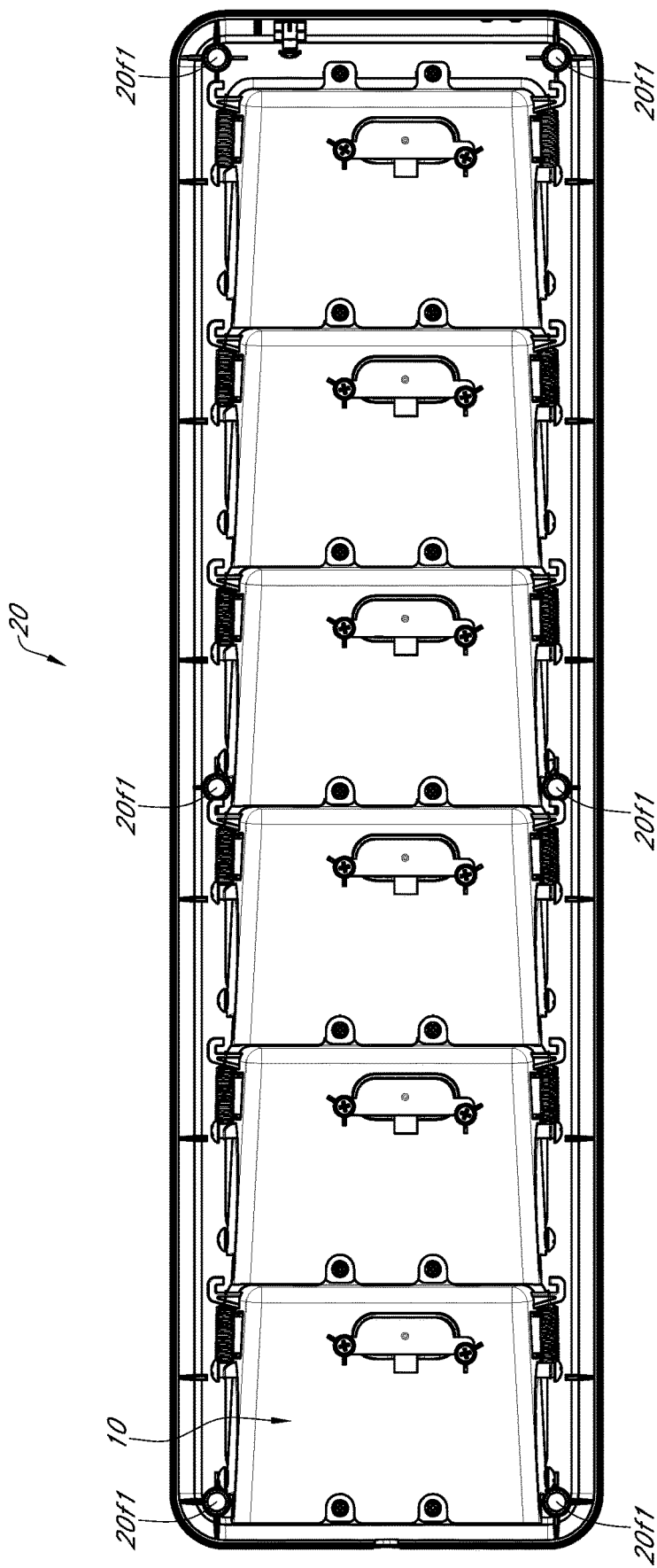
FIG. 31 is a bottom plan view of the charging station of FIG. 13 with its base portion removed.

Turning to FIG. 31, depicted therein is a bottom plan view of housing 20 coupled with multiple instances of holder assembly 10 and with base portion 20g removed.

Figure 32:
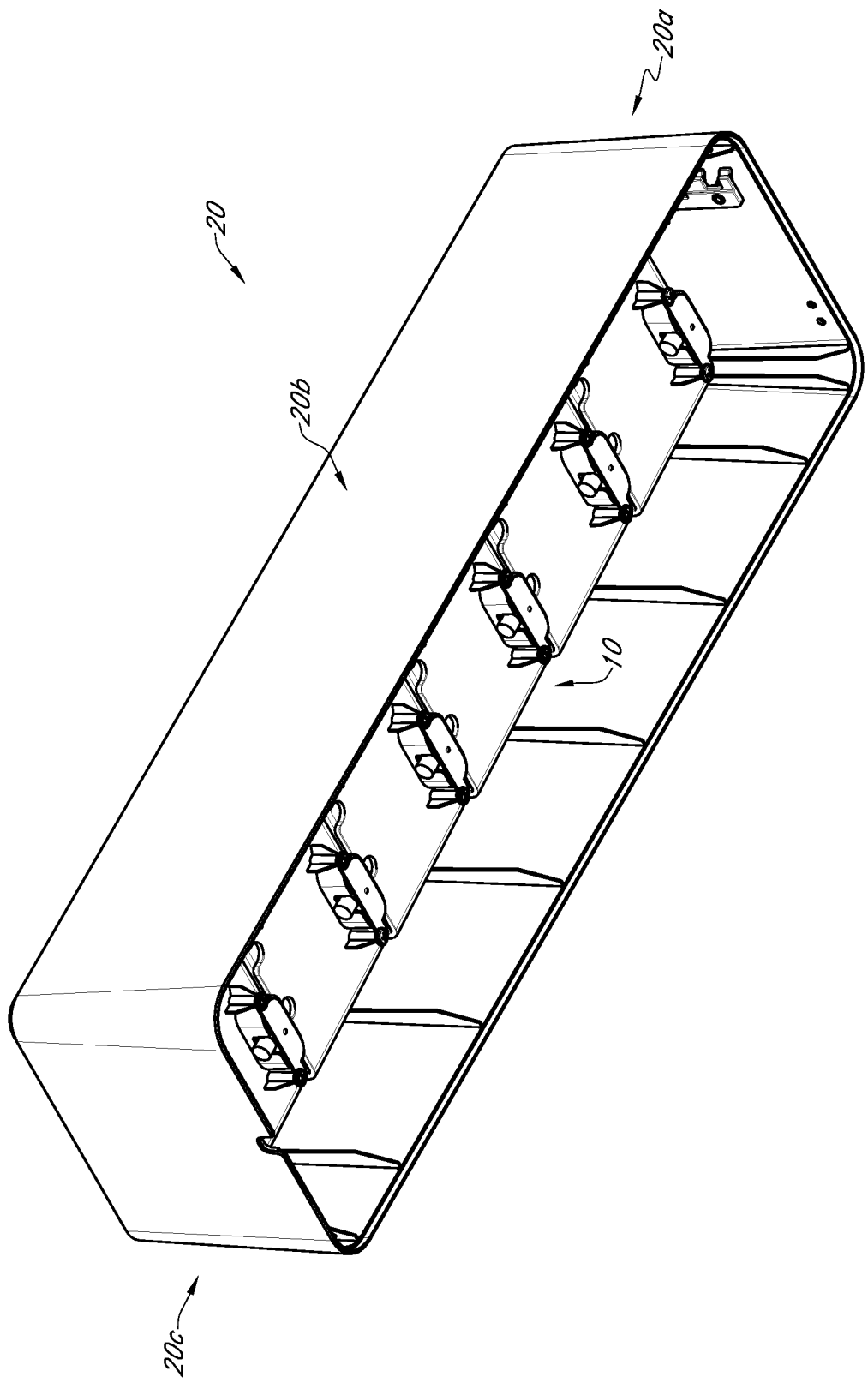
FIG. 32 is a left bottom rear perspective view of the charging station of FIG. 13 with its base portion removed.

Turning to FIG. 32, depicted therein is a left bottom rear perspective view of housing 20 coupled with multiple instances of holder assembly 10 and with base portion 20g removed.

Figure 33:
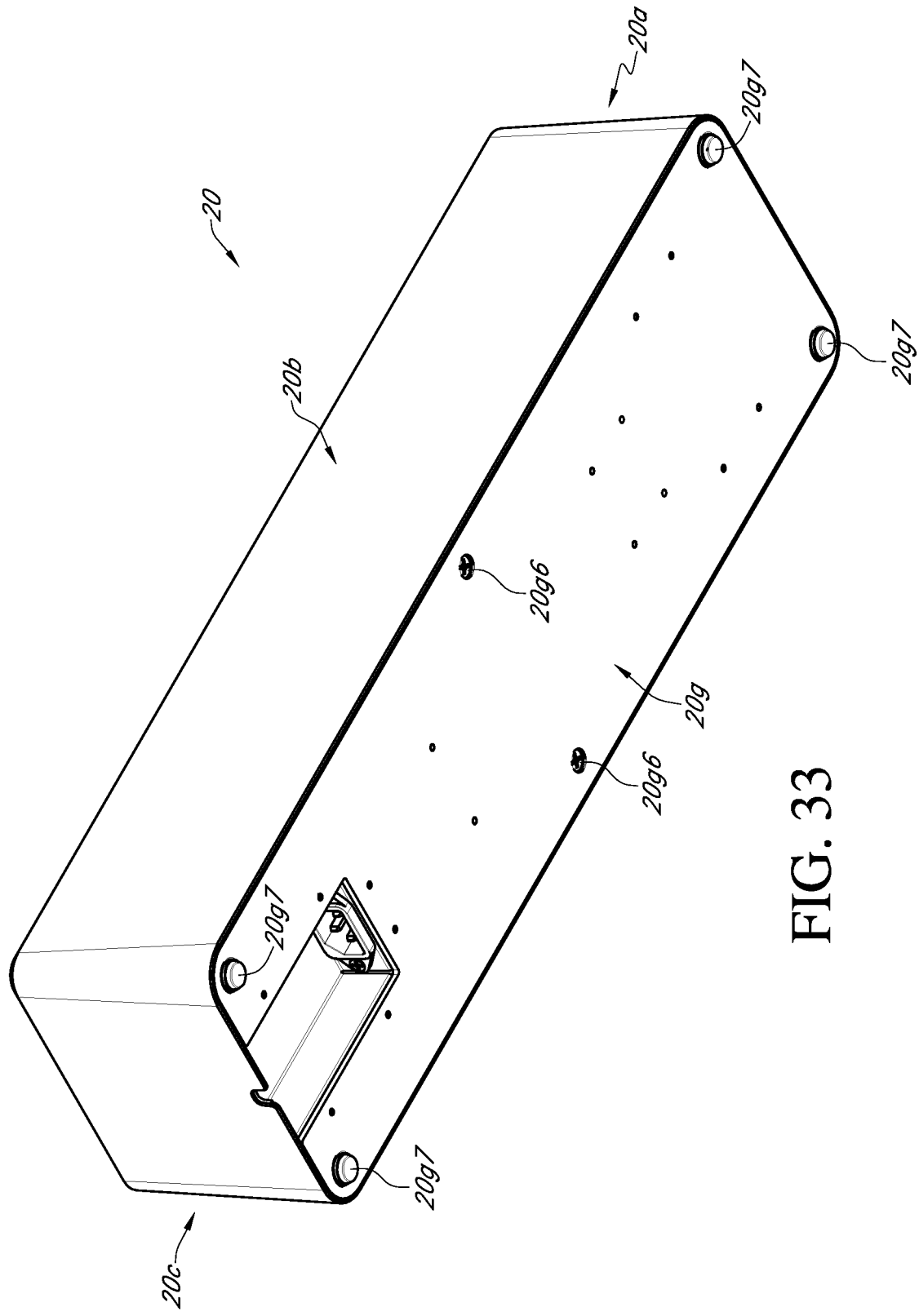
FIG. 33 is a left bottom rear perspective exploded view of the charging station of FIG. 13 including its base portion removed.

Turning to FIG. 33, depicted therein is a left bottom rear perspective exploded view of housing 20 including base portion 20g.

Figure 34:
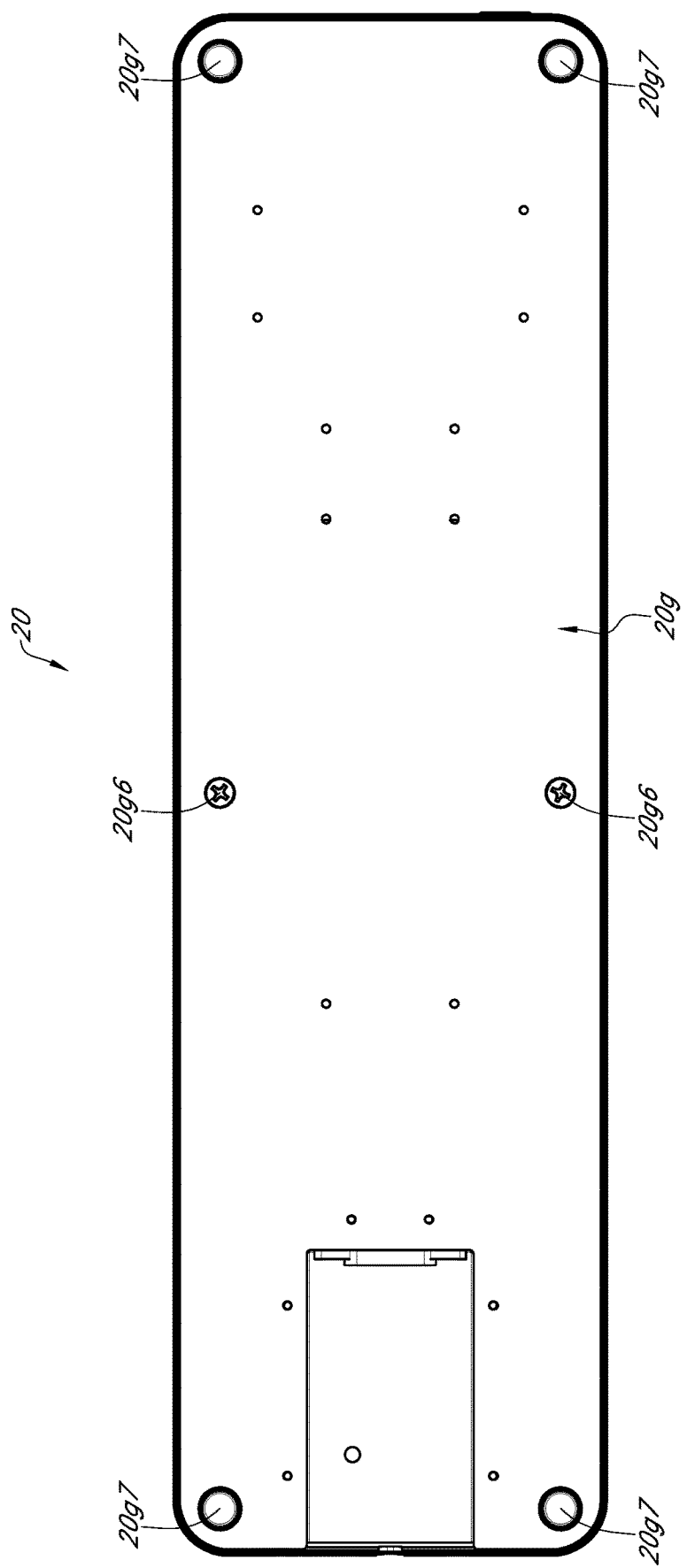
FIG. 34 is a bottom plan of the charging station of FIG. 13 including its base portion.

Turning to FIG. 34, depicted therein is a bottom plan view of holder assembly and housing 20 with base portion 20g.

Figure 35:
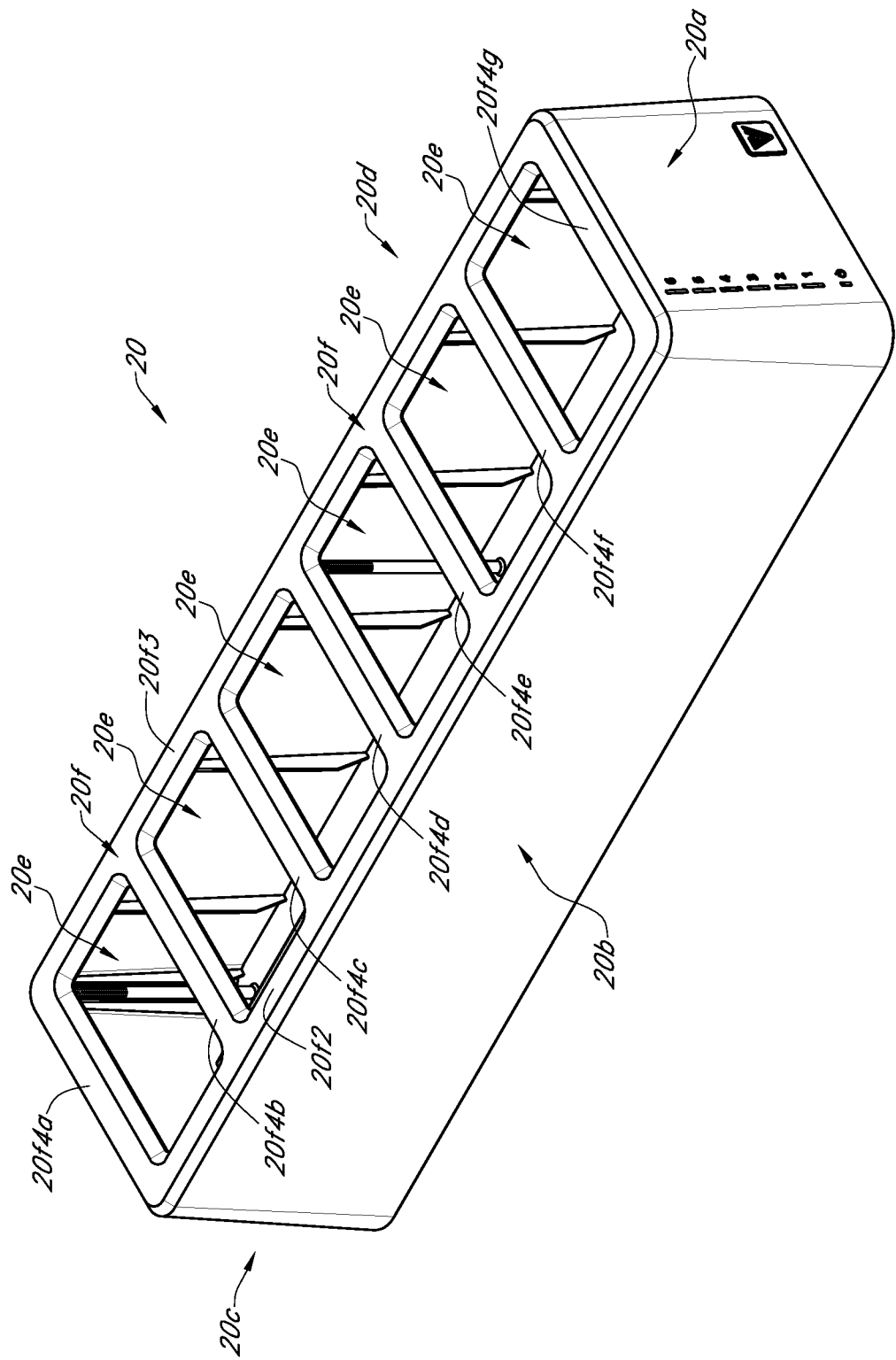
FIG. 35 is a left top front perspective view of a charging station case as also shown in FIG. 12.

Turning to FIG. 35, depicted therein is a left top front perspective view of housing 20 as also shown in FIG. 12.

Figure 36:
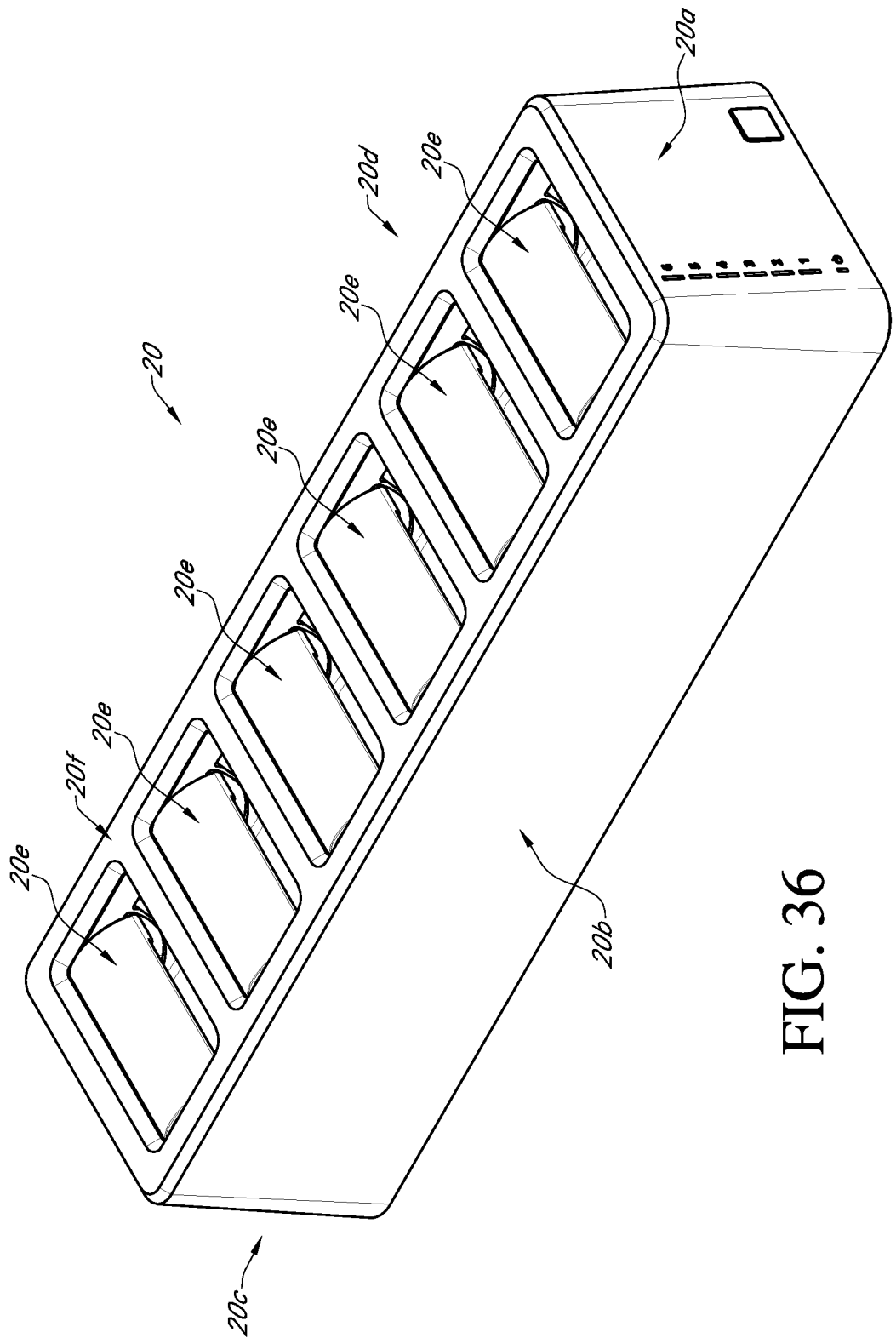
FIG. 36 is a left top front perspective view of the charging station case of FIG. 12 containing a plurality of the holders of FIG. 1 with the plurality of holders each including an adjustable back in a first position as also shown in FIG. 13.

Turning to FIG. 36, depicted therein is a left top front perspective view of holder assembly 10 and housing 20 with base portion 20g.

Figure 37:
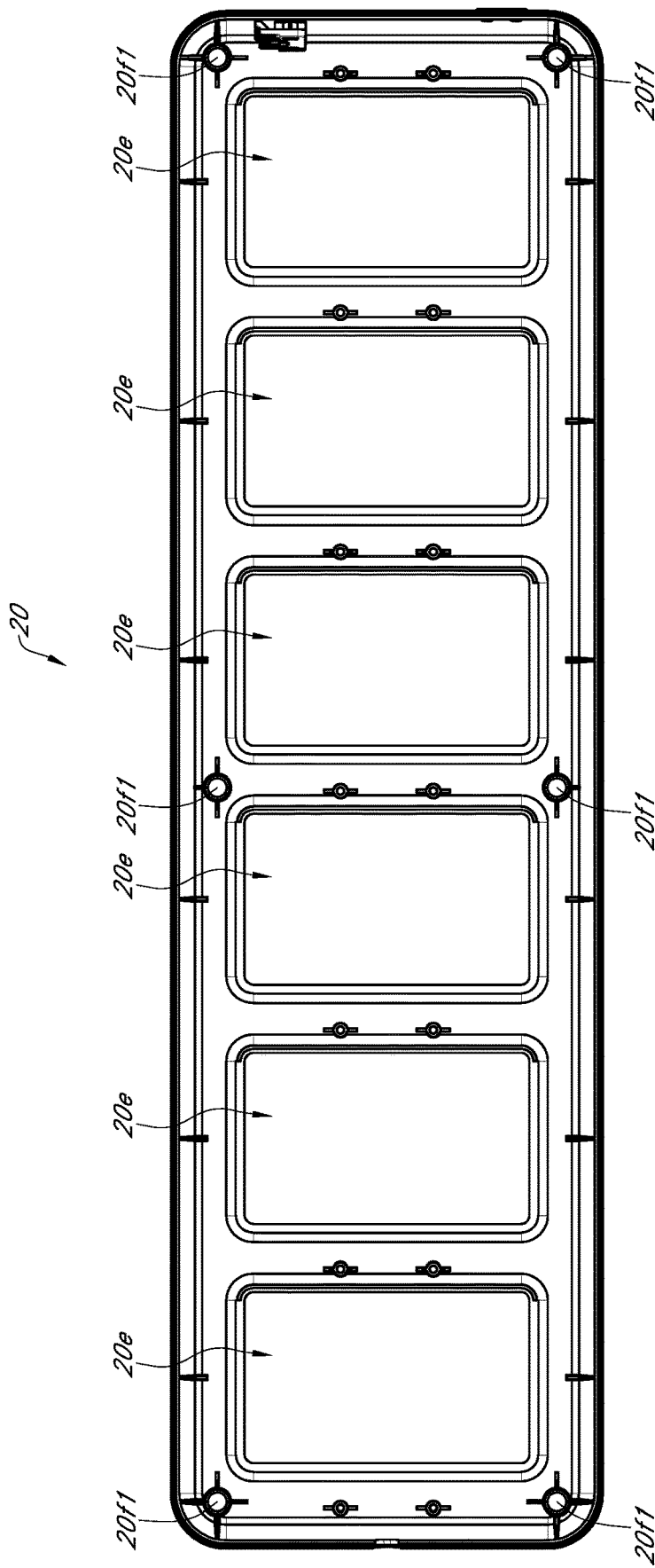
FIG. 37 is a bottom plan view of the charging station case of FIG. 13.

Turning to FIG. 37, depicted therein is a bottom plan view of housing 20.

Figure 38:
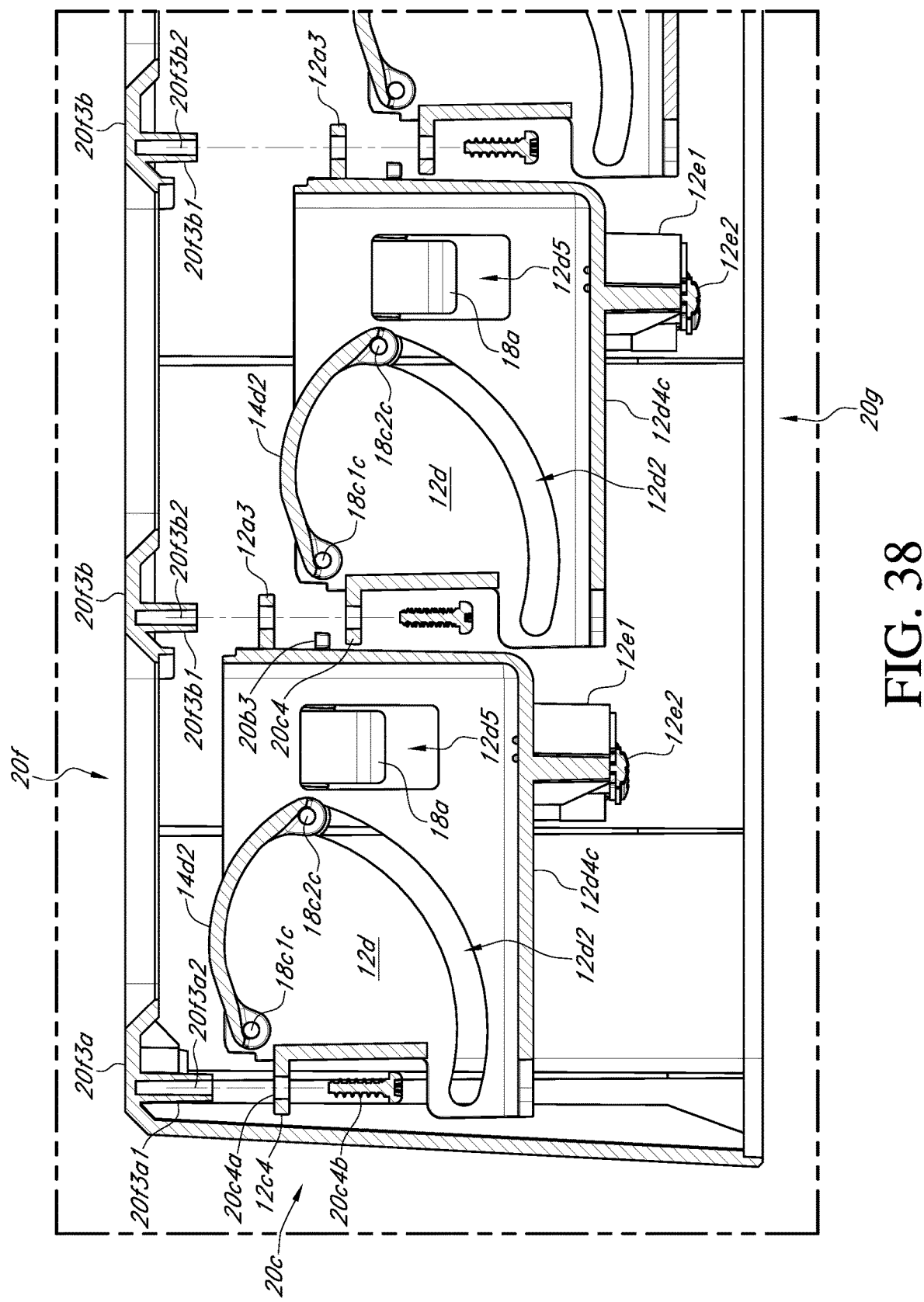
FIG. 38 is a cross-sectional side elevational view of multiple uncoupled instances of the holder of FIG. 1 being contained by a rear portion of the charging station case of FIG. 13.

Turning to FIG. 38, depicted therein is a cross-sectional side elevational view of multiple of holder assembly 10 uncoupled from rear portion of housing 20.

Figure 39:
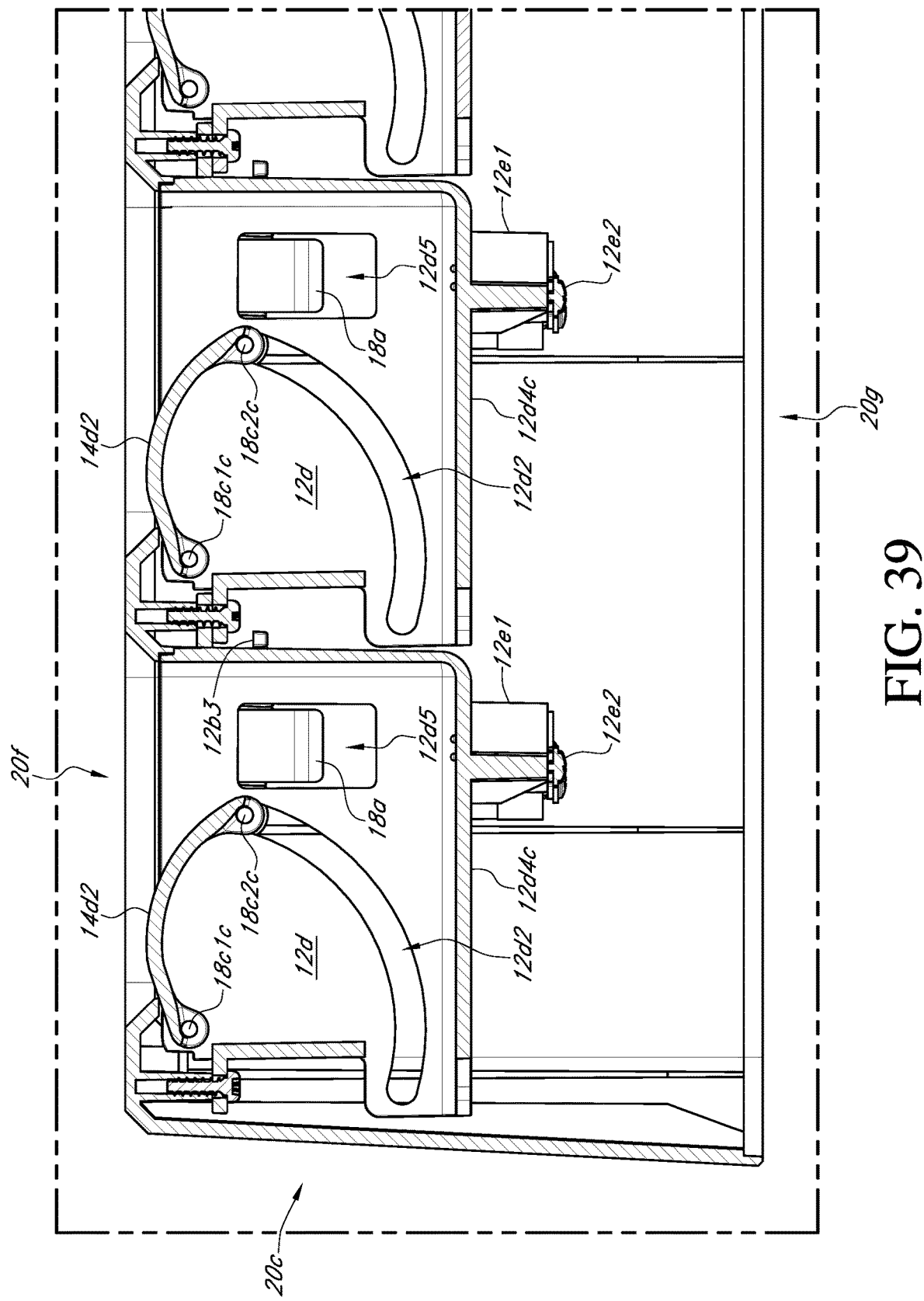
FIG. 39 is a cross-sectional side elevational view of multiple coupled instances of the holder of FIG. 1 being contained by a rear portion of the charging station case of FIG. 13.

Turning to FIG. 39, depicted therein is a cross-sectional side elevational view of multiple instances of holder assembly 10 uncoupled from rear portion of housing 20.

Figure 40:
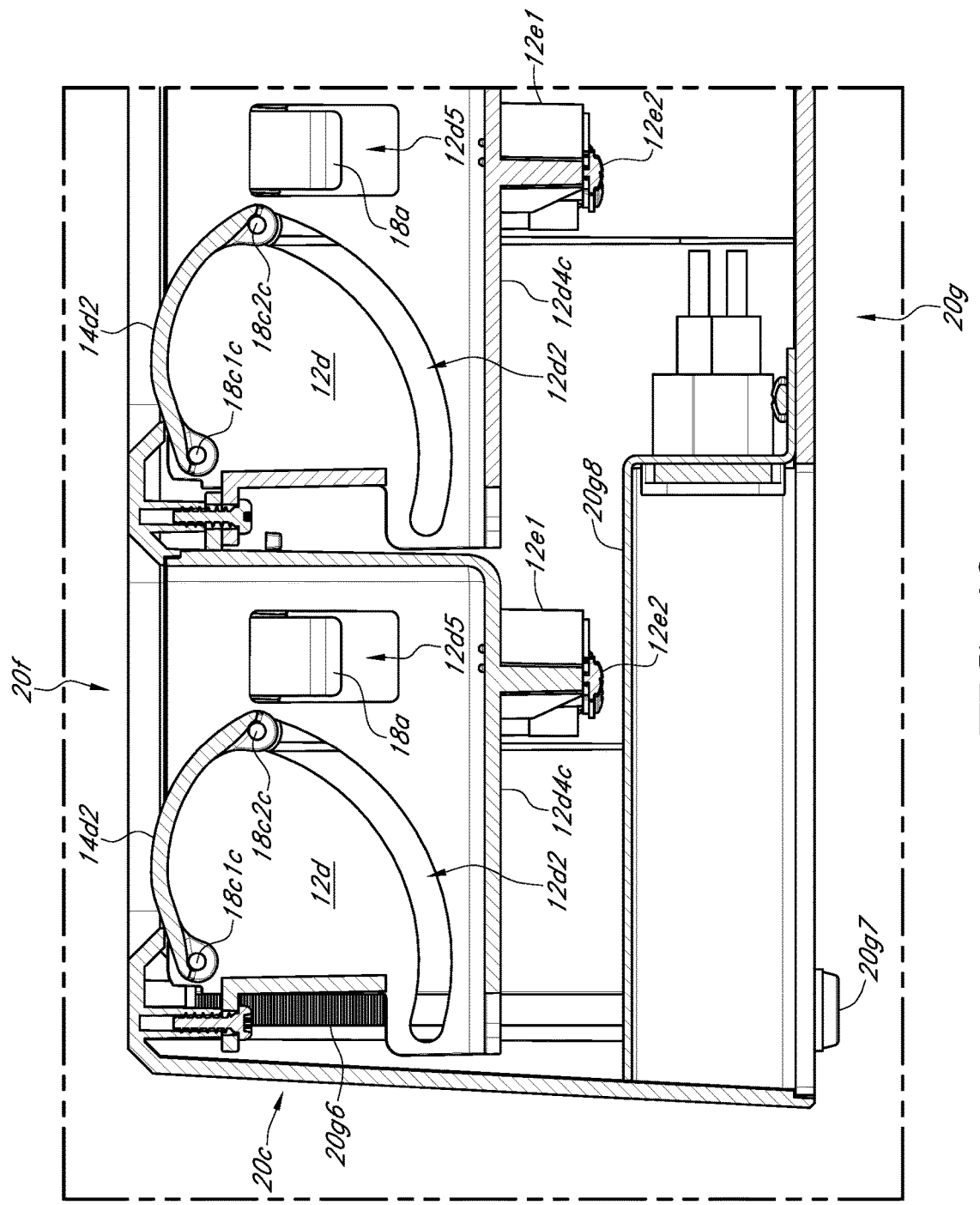
FIG. 40 is a cross-sectional side elevational view of multiple coupled instances of the holder of FIG. 1 being contained by a rear portion of the charging station case of FIG. 13.

Turning to FIG. 40, depicted therein is a cross-sectional side elevational view of multiple instances of holder assembly 10 coupled from rear portion of housing 20. As shown protrusion apertures of side portion 12a and side portion 12c being aligned with apertures of housing 20 in which protrusion apertures of side portion 12a are also aligned with protrusion apertures of side portion 12c when multiple instances of holder assembly 10 are coupled with housing 20. In other implementations, other types of location points of multiple instances of holder assembly 10 and of housing 20 could be used instead of apertures.

Figure 41:
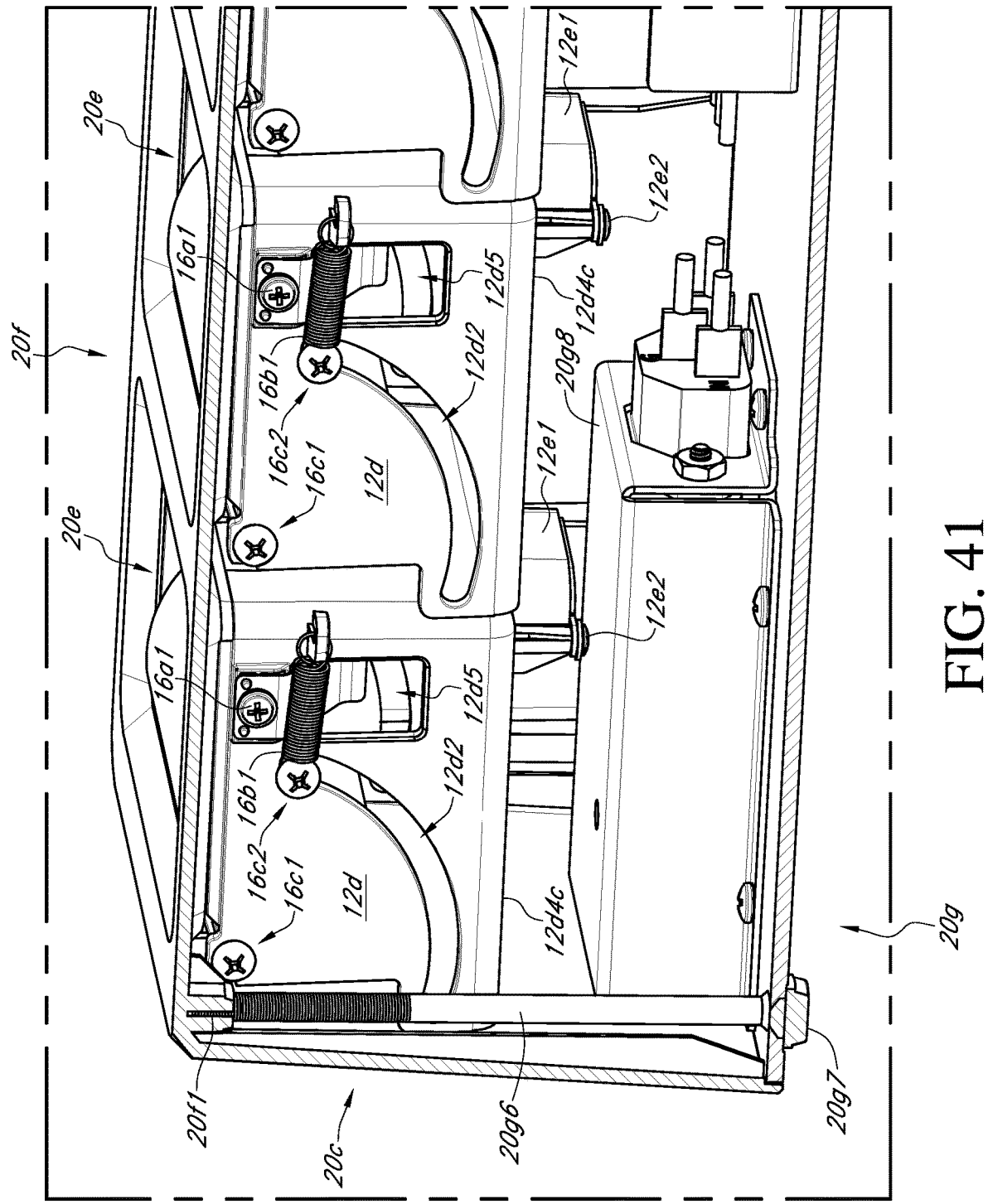
FIG. 41 is a cross-sectional side perspective view of multiple coupled instances of the holder of FIG. 1 being contained by a rear portion of the charging station case of FIG. 13.

Turning to FIG. 41, depicted therein is a cross-sectional side perspective view of multiple instances of holder assembly 10 coupled from rear portion of housing 20.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a portable electronic computing device, the system comprising:
    (I) at least one container assembly including
        (A) an interior area,
        (B) a base portion including an interior surface portion,
        (C) a first side portion including
            (i) an exterior surface portion facing away from the interior area, and
            (ii) at least one protrusion extending from the exterior surface portion, the at least one protrusion including a top surface portion and a bottom surface portion, the top surface portion being positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion, and
            wherein the first side portion in part bounds the interior area, and
        (D) a second side portion including
            (i) an exterior surface portion facing away from the interior area, and
            (ii) at least one protrusion extending from the exterior surface portion, the at least one protrusion including a top surface portion and a bottom surface portion, the top surface portion being positioned at a first elevation value with respect to when the interior surface portion of the base portion is being horizontally positioned, the bottom surface portion being positioned at a second elevation value with respect to when the interior surface portion of the base portion is being horizontally positioned, the first elevation value of the top surface portion being greater than the second elevation value of the bottom surface portion, wherein the second side portion in part bounds the interior area, and wherein the first side portion and the second side portion being opposingly spaced from one another, and wherein the first elevation value of the top surface portion of the at least one protrusion of the first side portion being greater than the first elevation value of the top surface portion of the at least one protrusion of the second side portion.

2. The system of claim 1
wherein the second elevational value of the bottom surface portion of the at least one protrusion of the first side portion being at least equal to the first elevation value of the top surface portion of the at least one protrusion of the second side portion.

3. The system of claim 1
wherein the second elevational value of the bottom surface portion of the at least one protrusion of the first side portion is equal to the first elevation value of the top surface portion of the at least one protrusion of the second side portion.

4. The system of claim 1
wherein the at least one protrusion of the first side portion includes a thickness portion between the top surface portion and the bottom surface portion of the at least one protrusion of the first side portion,
wherein a difference between the first elevational value of the top surface portion of the at least one protrusion of the first side portion and the first elevational value of the top surface portion of the at least one protrusion of the second side portion being at least equal to the thickness portion of the at least one protrusion of the first side portion.

5. The system of claim 1
wherein the at least one protrusion of the first side portion includes a thickness portion between the top surface portion and the bottom surface portion of the at least one protrusion of the first side portion,
wherein a difference between the first elevation value of the top surface portion of the at least one protrusion of the first side portion and the first elevational value of the top surface portion of the at least one protrusion of the second side portion being equal to the thickness portion of the at least one protrusion of the first side portion.

6. The system of claim 1
wherein the top surface portion of the at least one protrusion of the first side portion being flat, wherein the bottom surface portion of the at least one protrusion of the first side portion being flat,
wherein the top surface portion of the at least one protrusion of the second side portion being flat, and
wherein the bottom surface portion of the at least one protrusion of the second side portion being flat.

7. The system of claim 1, further including at least one duplicate of the at least one protrusion of the first side portion, and further including at least one duplicate of the at least one protrusion of the second side portion, wherein the at least one protrusion of the first side of the container assembly includes at least one first protrusion, the first protrusion including an aperture, the aperture including a center location, wherein the at least one duplicate of the at least one protrusion of the first side of the container assembly includes at least one second protrusion of the first side portion, the second protrusion including an aperture, the aperture including a center location, wherein the center location of the aperture of the first protrusion of the first side being spaced from the first side a first distance, wherein the center location of the aperture of the second protrusion of the first side being spaced from the first side a second distance, and wherein the first distance being equal to the second distance.

8. The system of claim 1
wherein the exterior surface portion of the first side portion occupying a portion of a plane,
wherein the at least one protrusion of the first side portion includes at least one aperture including a center,
wherein the center of the at least one aperture of the at least one protrusion of the first side portion being spaced from the plane of the exterior surface portion of the first side portion a first distance,
wherein the exterior surface portion of the second side portion occupying a portion of a plane,
wherein the at least one protrusion of the second side portion includes at least one aperture including a center,
wherein the center of the at least one aperture of the at least one protrusion of the second side portion being spaced from the plane of the exterior surface portion of the second side portion a second distance, and
wherein first distance between the center of the at least one aperture of the at least one protrusion of the first side portion from the plane of the exterior surface portion of the first side portion equals the second distance between the center of the at least one aperture of the at least one protrusion of the second side portion from the plane of the exterior surface portion of the second side portion.

9. The system of claim 1, further including at least one duplicate of the at least one protrusion of the first side portion, and further including at least one duplicate of the at least one protrusion of the second side portion, wherein the at least one protrusion of the first side of the container assembly includes at least one first protrusion, the first protrusion including an aperture, the aperture including a center location, wherein the at least one duplicate of the at least one protrusion of the first side of the container assembly includes at least one second protrusion of the first side portion, the second protrusion including an aperture, the aperture including a center location, wherein the center location of the aperture of the first protrusion of the first side being spaced from the center location of the aperture of the second protrusion of the first side a first distance, wherein the at least one protrusion of the second side of the container assembly includes at least one first protrusion, the first protrusion including an aperture, the aperture including a center location, wherein the at least one duplicate of the at least one protrusion of the second side of the container assembly includes at least one second protrusion, the second protrusion including an aperture, the aperture including a center location, wherein the center location of the aperture of the first protrusion of the second side being spaced from the center location of the aperture of the second protrusion of the second side a second distance, and wherein the first distance being equal to the second distance.

10. The system of claim 1 wherein the first side portion of the at least one container assembly further includes an end portion, wherein the end portion of the first side portion being extended parallel to the plane of the interior surface portion of the base portion, wherein the end portion of the first side portion being positioned from the plane of the interior surface portion of the base portion a distance greater than any other portion of the first side portion, and wherein the surface portion of the at least one protrusion being closer to the end portion of the first side portion than to the base portion.

11. The system of claim 1 wherein the base portion includes (i) a first portion in part bounding the interior area of the at least one container assembly, and (ii) a second portion including at least one notch, wherein the exterior surface portion of the first side portion occupying a portion of a plane, wherein the exterior surface portion of the second side portion occupying a portion of a plane, wherein the second portion of the base portion being extended in a direction opposite from a direction that the first portion of the base portion being extended with respect to a selected reference plane being selected from one of the following: the plane of the exterior surface portion of the first side portion of the at least one container assembly or the plane of the exterior surface portion of the second side portion of the at least one container assembly, wherein the at least one protrusion of the first side portion includes at least one aperture including a center, wherein the at least one protrusion of the second side portion includes at least one aperture including a center, and wherein the at least one notch of the second portion of the base portion being aligned along a directional axis, the directional axis being perpendicular to the plane of the interior surface portion of the base portion, the at least one notch of the second portion of base portion being aligned with a selected center being selected from one of the following: the center of the at least one aperture of the at least one first side portion or the center of the at least one aperture of the at least one second side portion.

12. The system of claim 11 wherein the second portion of the base portion extends further from the selected reference plane than the selected center extends from the selected reference plane.

13. The system of claim 1 further including (II) at least one housing including a first side, a second side, and a plurality of members extending between the first side and the second side, wherein the plurality of members include a first member and a second member, wherein the first member including at least one aperture, wherein the second member including at least one aperture, wherein the at least one protrusion of the first side portion includes at least one aperture, wherein the at least one protrusion of the second side portion includes at least one aperture, and wherein the at least one aperture of the first member spaced from the at least one aperture of the second member to allow for simultaneous alignment of the at least one aperture of the at least one protrusion of the first side with the at least one aperture of the first member and simultaneous alignment of the at least one aperture of the at least one protrusion of the second side with the at least one aperture of the second member.

14. The system of claim 13 further including at least one duplicate of the at least one container assembly, wherein the at least one duplicate of the at least one container assembly includes at least one second container assembly, wherein the at least one aperture of the at least one protrusion of the first side of the at least one container assembly being coupled with the at least one aperture of the first member of the at least one housing, wherein the at least one aperture of the at least one protrusion of the second side of the at least one second container assembly being coupled with the at least one aperture of the first member of the at least one housing, wherein the at least one aperture of the at least one protrusion of the second side of the at least one second container assembly being coupled with the at least one aperture of the at least one protrusion of the first side of the at least one container assembly, and wherein the at least one aperture of the at least one protrusion of the first side of the at least one second container assembly being coupled with the at least one aperture of the second member of the at least one housing.

15. A system for a portable electronic computing device, the system comprising:

(I) at least one first box assembly including a base, a first side, a second side, and an interior area, wherein the first side being oppositely positioned across the interior area from the second side, the first side including at least one protrusion extending from the first side away from the interior area, the second side including at least one protrusion extending from the second side away from the interior area, and the at least one protrusion of the first side being at a different elevation than the at least one protrusion of the second side with respect to the base.

16. The system of claim 15 further including at least one duplicate of the at least one first box assembly, wherein the at least one duplicate of the at least one first box assembly includes at least one second box assembly, wherein the at least one protrusion of the first side of the at least one first box assembly being coupled to the at least one protrusion of the second side of the at least one second box assembly.

17. The system of claim 16 further including at least one housing, wherein the at least one housing includes a first side, a second side, and a plurality of members extending between the first side and the second side, wherein the plurality of members includes a first member, wherein the first member including at least one location point, wherein the at least one protrusion of the first side of the at least one first box assembly being coupled to the at least one location point of the first member, and wherein the at least one protrusion of the second side of the at least one second box assembly being coupled to the at least one location point of the first member.

18. A system for a portable electronic computing device, the system comprising:
   (I) a plurality of boxes, the plurality of boxes including a plurality of bases, a plurality of first sides, a plurality of second sides, and plurality of interior areas,
   wherein the plurality of first sides being positioned opposite of the plurality of second sides,
   wherein the plurality of first sides includes a plurality of protrusions extending from the plurality of first sides away from the plurality of interior areas, and
   wherein the plurality of second sides includes a plurality of protrusions extending from the plurality of second sides away from the plurality of interior areas; and
   (II) at least one housing including a first side and a second side and a plurality of members extending from the first side to the second side,
   the plurality of members including a plurality of location points,
   wherein the plurality of protrusions of the plurality of first sides of the plurality of boxes being coupled with the plurality of location points of the plurality of members of the at least one housing, and
   wherein the plurality of protrusions of the plurality of second sides of the plurality of boxes being coupled with the plurality of location points of the plurality of members of the at least one housing.

19. The system of claim 18
   wherein the plurality of location points of the plurality of members of the at least one housing being a plurality of apertures.

20. The system of claim 18
   wherein the plurality of protrusions of the plurality of first sides of the plurality of boxes being coupled with the plurality of location points of the plurality of members of the at least one housing via threaded members, and
   wherein the plurality of protrusions of the plurality of second sides of the plurality of boxes being coupled with the plurality of location points of the plurality of members of the at least one housing via threaded members.

* * * * *